US010588291B2

(12) United States Patent
Kuiper et al.

(10) Patent No.: US 10,588,291 B2
(45) Date of Patent: Mar. 17, 2020

(54) ANIMAL WASTE DISPOSAL SYSTEM

(71) Applicant: Grotown VI, LLC, Grand Rapids, MI (US)

(72) Inventors: William J. Kuiper, Hudsonville, MI (US); Stephen J. Timyan, Grand Rapids, MI (US)

(73) Assignee: Grotown VI, LLC, Grand Rapids, MI (US)

( * ) Notice: Subject to any disclaimer, the term of this patent is extended or adjusted under 35 U.S.C. 154(b) by 783 days.

(21) Appl. No.: 14/884,888

(22) Filed: Oct. 16, 2015

(65) Prior Publication Data

US 2016/0029587 A1 Feb. 4, 2016

Related U.S. Application Data

(63) Continuation-in-part of application No. 14/692,899, filed on Apr. 22, 2015, now Pat. No. 9,949,458, which is a continuation of application No. 29/491,358, filed on May 20, 2014, now Pat. No. Des. 731,716.

(60) Provisional application No. 62/000,807, filed on May 20, 2014.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC .... A01K 1/011; A01K 1/0114; A01K 1/0107; A01K 1/0125; A01K 1/0151; B65D 33/002; B65D 31/10; B65D 33/08; B65D 33/1608

USPC .................. 119/166, 165, 167, 168; 294/1.3; 383/10, 120

See application file for complete search history.

(56) References Cited

U.S. PATENT DOCUMENTS

| | | | |
|---|---|---|---|
| 529,053 A * | 10/1894 | Wilcox | .................... 229/117.21 |
| 3,613,943 A | 10/1971 | Bridenstine | |
| 3,684,155 A | 8/1972 | Smith | |
| 3,757,990 A | 9/1973 | Buth | |
| 3,771,493 A | 11/1973 | Chandor | |
| 3,809,013 A | 5/1974 | Rigney et al. | |
| 3,831,557 A | 8/1974 | Elesh | |
| 3,990,396 A | 11/1976 | Turk | |
| 4,217,857 A | 8/1980 | Geddie | |
| 4,279,217 A | 7/1981 | Behringer | |

(Continued)

*Primary Examiner* — Kathleen I Alker
*Assistant Examiner* — Jeffrey R Larsen
(74) *Attorney, Agent, or Firm* — Warner Norcross + Judd, LLP

(57) ABSTRACT

A waste disposal apparatus having outwardly-canted sidewalls and a base wall forming a basin. A liner is centrally disposed on an interior of the basin. At least one litter sieve is centrally arranged on the liner. A securing flange is located on a top portion of the sidewalls and is operable between a closed position and an open position and includes at least one handle protrusion. The litter sieves and the liner are held securely in place by the securing flange when the securing flange is in the closed position. A litter sieve can include opposing handle ribbons removably disposed in corresponding envelopes on opposite sides of the sieve. The envelopes can include frangible elements that selectively secure the handle ribbons, but that fail upon application of a force so that the ribbons can at least partially exit the envelopes and thereafter used to lift a loaded sieve.

19 Claims, 22 Drawing Sheets

(56) References Cited

U.S. PATENT DOCUMENTS

| | | |
|---|---|---|
| 4,305,544 A | 12/1981 | Noonan |
| 4,308,825 A | 1/1982 | Stepanian |
| 4,312,295 A | 1/1982 | Harrington |
| 4,469,046 A | 9/1984 | Yananton |
| 4,501,226 A | 2/1985 | Bienvenu et al. |
| 4,548,160 A | 10/1985 | Feitelson |
| 4,615,300 A | 10/1986 | McDonough |
| 4,646,684 A | 3/1987 | Embry |
| 4,648,349 A | 3/1987 | Larson |
| 4,723,510 A | 2/1988 | Skillestad |
| 4,739,725 A | 4/1988 | Fennelly |
| 4,784,082 A | 11/1988 | Wolfe |
| 4,813,374 A | 3/1989 | Sides |
| 4,846,105 A | 7/1989 | Caldwell |
| 4,869,204 A | 9/1989 | Yananton |
| 4,870,924 A * | 10/1989 | Wolfe ............... A01K 1/0107 119/167 |
| 4,934,316 A * | 6/1990 | Mack .................. A01K 1/0107 119/169 |
| 4,967,692 A | 11/1990 | Mills |
| 5,038,721 A | 8/1991 | Ouellette et al. |
| 5,062,392 A | 11/1991 | Lavash |
| 5,078,099 A | 1/1992 | Balson |
| 5,115,766 A | 5/1992 | Williams |
| 5,121,712 A | 6/1992 | Schulein, Jr. et al. |
| 5,158,042 A | 10/1992 | Hammerslag et al. |
| 5,207,772 A | 5/1993 | Lauretta et al. |
| 5,325,815 A | 7/1994 | Gumpesberger |
| 5,372,095 A * | 12/1994 | Dowling ............. A01K 1/0114 119/166 |
| 5,410,987 A | 5/1995 | Simmons |
| 5,488,929 A | 2/1996 | Pierson et al. |
| 5,499,610 A | 3/1996 | Bruner et al. |
| 5,507,248 A | 4/1996 | Gabber |
| 5,551,376 A | 9/1996 | Lundeen et al. |
| 5,555,844 A | 9/1996 | Kolomeyer |
| 5,598,811 A | 2/1997 | Merchant |
| D378,451 S | 3/1997 | Schmidt |
| 5,636,594 A | 6/1997 | Pina |
| 5,752,466 A | 5/1998 | Lundeen et al. |
| 5,755,181 A | 5/1998 | Petkovski |
| 5,785,001 A | 7/1998 | Robinson |
| 5,791,289 A | 8/1998 | Savicki |
| 5,794,566 A | 8/1998 | Goetz et al. |
| 5,799,610 A | 9/1998 | Poulos |
| 5,832,869 A * | 11/1998 | Franczak ............ A01K 1/0107 119/168 |
| D408,949 S | 4/1999 | Queen |
| 5,890,452 A | 4/1999 | Lundeen et al. |
| 5,983,832 A | 11/1999 | Seo |
| D426,684 S | 6/2000 | Kenney |
| 6,135,058 A | 10/2000 | Jaeger |
| 6,267,078 B1 | 7/2001 | Pina |
| 6,595,159 B1 | 7/2003 | Montalbano |
| 6,668,755 B1 | 12/2003 | Koster |
| D488,890 S | 4/2004 | Radde |
| 6,824,114 B1 | 11/2004 | VanSkiver |
| 6,837,179 B2 | 1/2005 | Sannikka |
| D526,748 S | 8/2006 | Van Skiver |
| 7,255,261 B2 | 8/2007 | Mesly |
| 7,380,519 B2 | 6/2008 | Ikegami et al. |
| 8,074,603 B2 | 12/2011 | Ohlman et al. |
| 8,220,622 B1 | 7/2012 | Lewis et al. |
| 2007/0215058 A1 | 9/2007 | Spreitzer |
| 2007/0215059 A1 | 9/2007 | Sefranek |
| 2008/0041316 A1 | 2/2008 | Hartzell |
| 2009/0194033 A1 | 8/2009 | Modlin |
| 2009/0304307 A1* | 12/2009 | Diep .................... B65D 33/002 383/7 |
| 2010/0012043 A1 | 1/2010 | Wenzel |
| 2013/0152863 A1 | 6/2013 | Peterson |
| 2013/0327278 A1 | 12/2013 | Reichert |
| 2014/0283753 A1* | 9/2014 | Dawn ................. A01K 1/0114 119/166 |

* cited by examiner

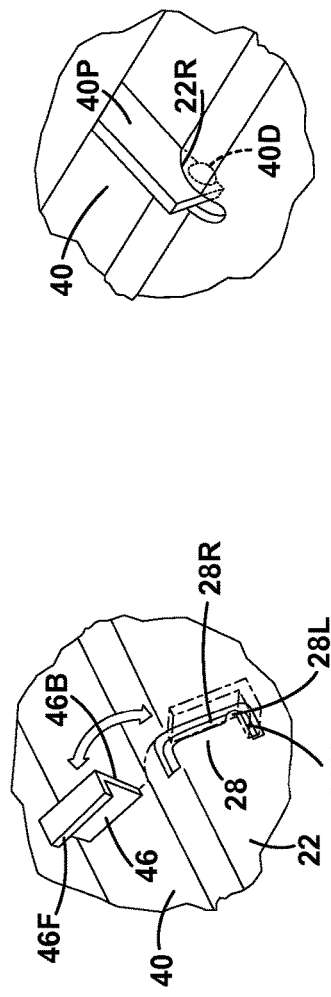
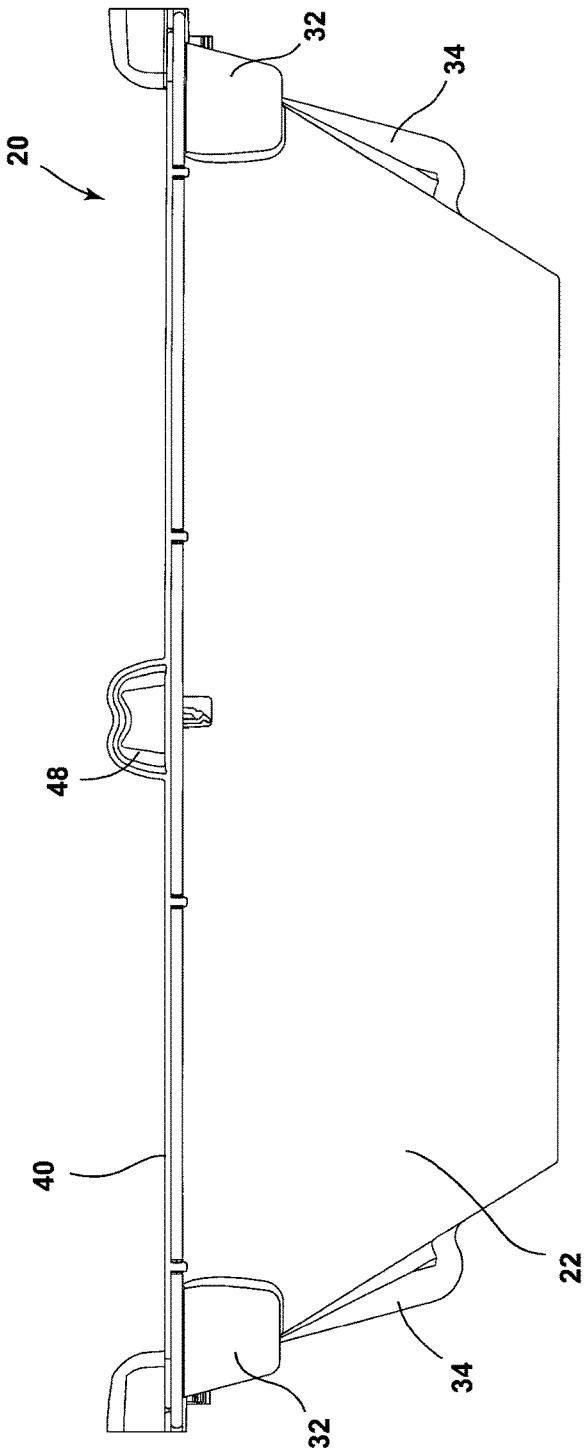

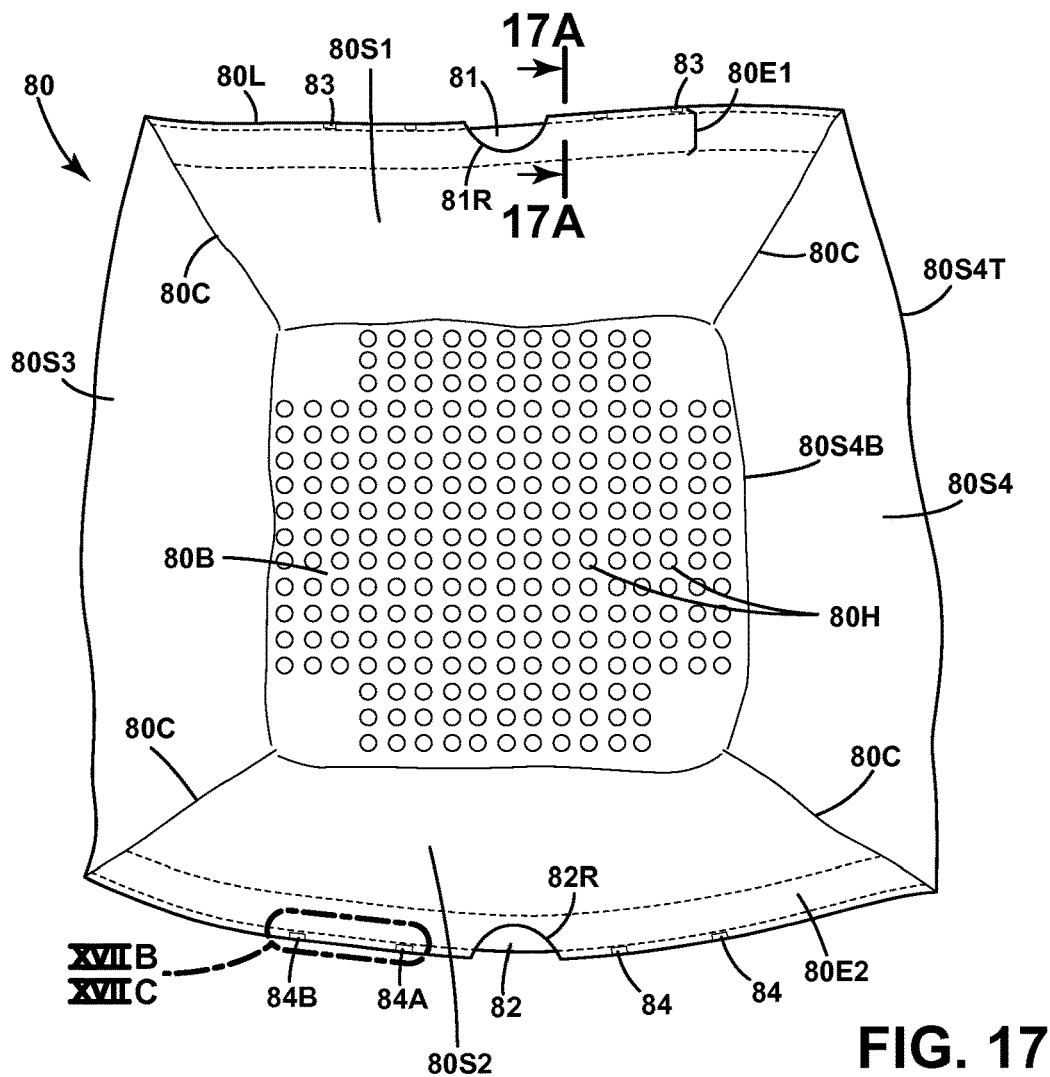
FIG. 17
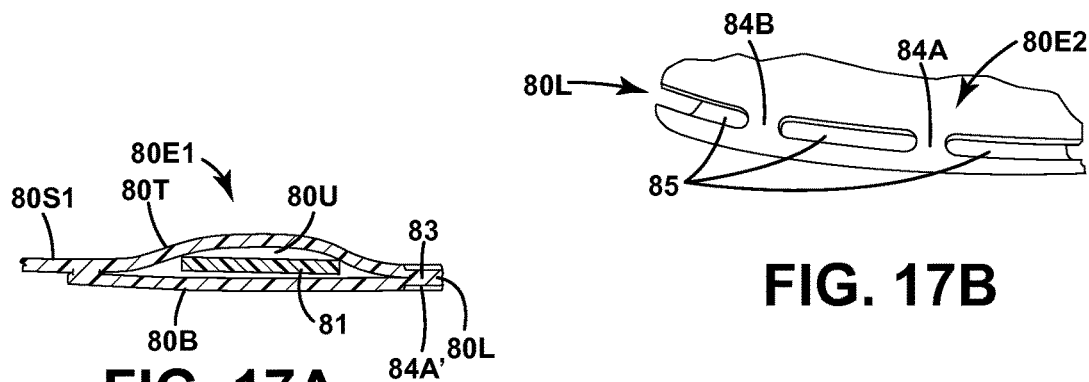
FIG. 17A
FIG. 17B
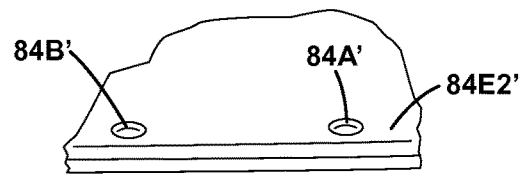
FIG. 17C

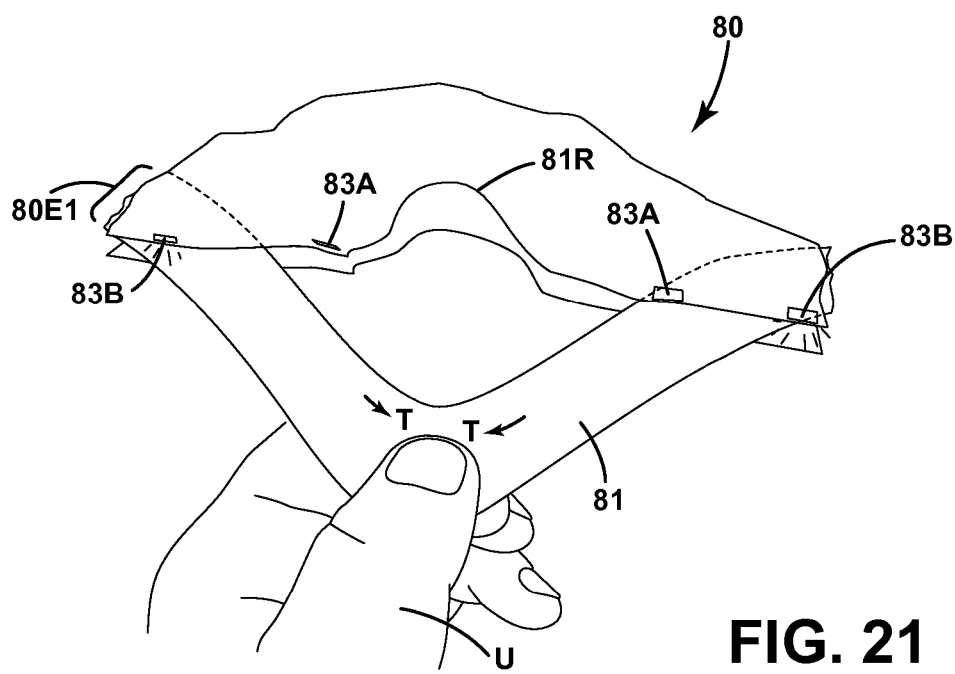
FIG. 21
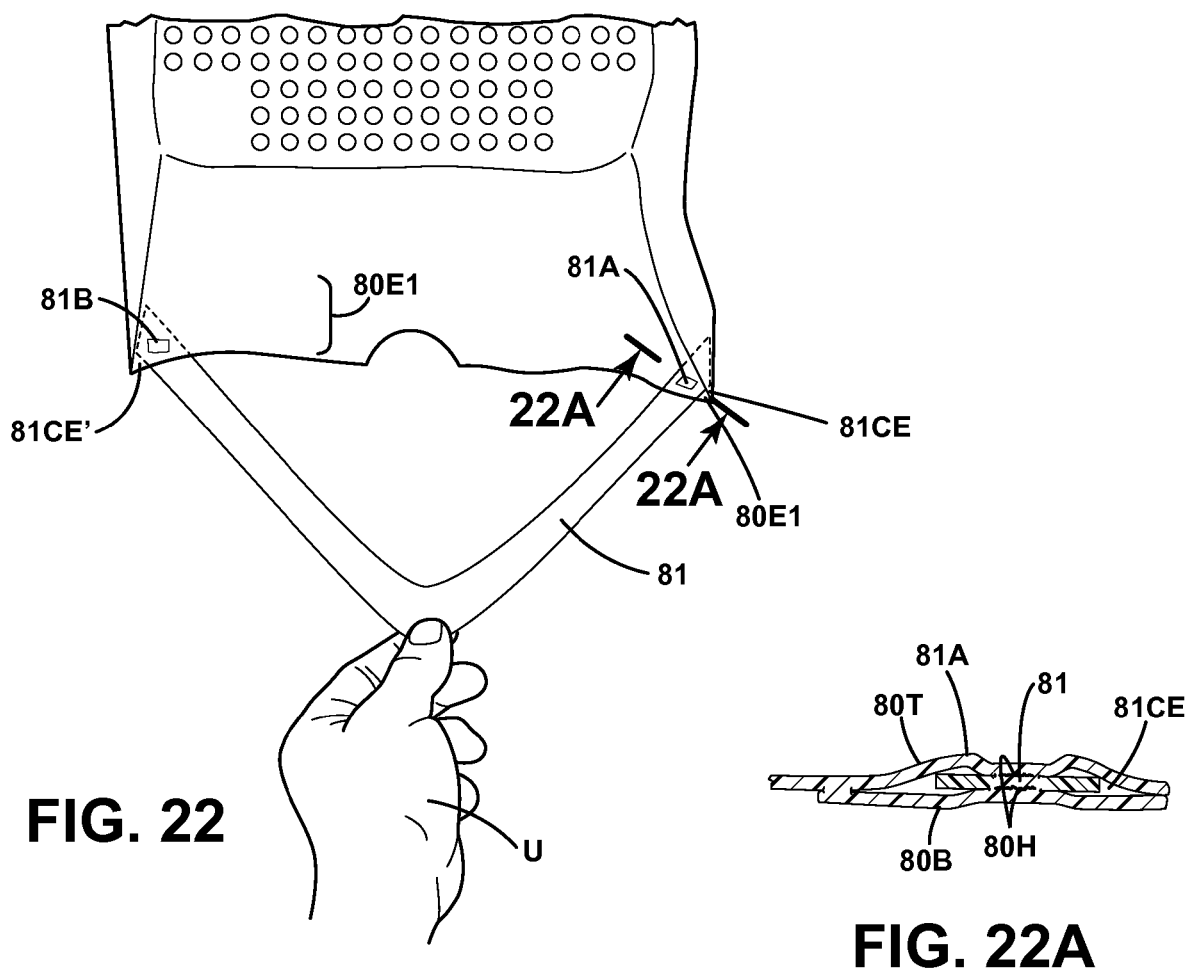
FIG. 22
FIG. 22A

ANIMAL WASTE DISPOSAL SYSTEM

BACKGROUND OF THE INVENTION

The present invention generally relates to an animal waste disposal system and a method for constructing the same.

Conventional animal waste disposal systems are often difficult to handle for a user and messy during the waste removal process. This can lead to unwanted odors, extra time and resources to clean the systems, and in some cases, unhygienic conditions on or around the disposal systems.

SUMMARY OF THE INVENTION

In one embodiment, a waste disposal apparatus is provided, including multiple outwardly-canted sidewalls and a base wall forming a basin. A liner can be centrally disposed in an interior of the basin. One or more litter sieves can be centrally arranged on the liner.

In another embodiment, at least one securing flange can be located on a top portion of the sidewalls. The securing flange can be operable between a closed position and an open position and can include at least one handle protrusion. The sidewalls can include at least one handle protrusion. The litter sieves and the liner can be held securely in place by the at least one securing flange when the at least one securing flange is in the closed position.

In still another embodiment, the securing flange can include a flexible, resilient and/or moveable engagement flange that is configured to engage the litter sieves and/or liner. The engagement flange can flex or move when the number or thickness of sieves between it and the sidewalls is substantial. However, when the number or thickness of the sieves between it and the sidewalls is insubstantial, the engagement flange still can hold the sieves and/or liner in place, optionally without flexing or moving much or at all.

In yet another embodiment, the securing flange and/or sidewalls can include a lock to hold the securing flange, and optionally the engagement flange, in locked engagement with the sieves and/or liner. This, in turn, can hold the sieves and liner in a desired configuration in the basin. The lock can be disengaged by a user engaging the handle protrusions and applying a force sufficient to overcome the lock. Upon this action, the securing flange moves, optionally rotating, to the open position to provide access to the sieves and/or liner.

In even another embodiment, the litter sieves can include multiple pass-through holes generally arranged in a plus sign configuration. The pass through holes can be formed as cutouts or open voids in a base of the sieves, optionally in the form of circular or other rounded apertures to facilitate rapid evacuation of litter from the sieves upon removal from the basin.

In even yet another embodiment, the litter sieves and liner can include first and second handles positioned on opposing sides of each of the same. The handles can be in the form of slits in the bases of the sieves and/or liners disposed inwardly from an outer lateral edge of the base. A user can project their hand through the slits to access and grasp the handles. Using the handles the user can lift the sieve and/or liner from the basin. The handles can be strong enough so that they do not tear upon the lifting of the sieve and/or liner, even with litter or waste located in the sieve and/or liner.

In a further embodiment, the litter sieves and liner can include first and second handles positioned on opposing sides of each of the same. The handles can be in the form of elongate strips, and can be temporarily enclosed in corresponding first and second envelopes on opposing sides of the same.

In still a further embodiment, the envelopes can be frangible or destructible so that they can open and allow the strips to exit or otherwise move at least partially out from the envelopes upon application of a predetermined force to the strips. With this construction, the strips remain out of the way and do not readily tangle, for stacking, piling and/or handling of the litter sieves and liner, before installation in the basin. However, when a user desires to use the handles, the user can engage a portion of the strips, pull on them, and move the strips at least partially out of the envelopes easily to facilitate conversion of the sieves and/or liner from a generally open configuration to a smaller "parachute" configuration conducive to lifting and dumping excess litter in the sieves back into the basin, atop the next remaining sieve and/or liner.

In even another embodiment, the litter sieves and/or liner can include the above strips disposed in the envelopes. The envelopes can be closed along a portion of the same, generally above the strips, with a frangible element that breaks, tears or releases upon the application of about 0.5 pounds to about 15 pounds, optionally between 2 pounds and 5 pounds, so as to enable the strips to pull free from at least a portion of the envelope. The frangible element can be in the form of tacked or hot welded spots, or in the form of perforations, or small, weak portions of the envelope that temporarily connect front and rear or other panels of the envelope.

In a further embodiment, the litter sieves and/or liner can include first and second handles positioned on opposing sides of each of the same. The handles can be located at an uppermost part of a corresponding and adjacent sidewall main body. The handles can be in the form of elongate strips, each of which include an outer lateral edge and an interior portion. The interior portion can be bounded by one or more slits, which encompasses perforations, and temporarily attached to the sidewall main body. The interior portion can be detachably attached to a main body of an adjacent sidewall, so that a user can separate an elongated strip at least partially from the sidewall main body by pulling on the same. In turn, this can convert the strips into functional handles which can be used to suspend and carry the remainder of the sieve and/or liner.

In still a further embodiment, the litter sieves and/or liner can include first and second hand openings defined between the elongated strips and the sidewall main body. These hand openings can be sized and shaped so that a user can place a portion of a hand through the same. With the hand through the hand opening, the user can engage and pull the elongated strip, thereby causing the perforations to fail and the elongated strip to separate farther from the sidewall main body. Optionally, the hand opening can be disposed and/or can intersect the perforations or a portion thereof. In some cases, the perforations can be deleted where the hand opening is located.

In yet a further embodiment, the litter sieves and/or liner can be initially constructed from a flat, two-dimensional sheet of polymeric material. In this flat form, the construction can include a base that is joined with a plurality of sidewalls. The base can be generally centrally located relative to the sidewalls. The construction can include multiple corners. These corners can define respective voids, when the construction is in its platform. The voids can be formed between adjacent sidewall main bodies. One or more of the adjacent sidewall main bodies can be joined with an overlap flap. This overlap flap can be sized and shaped so that it overlaps and adjacent sidewall main body when the sidewalls are reconfigured from the flat form to a generally three-dimensional form. Optionally, the overlap flap of one sidewall main body can overlap and the secured or fastened to an adjacent sidewall main body to complete a structural corner.

In even another embodiment, a method is provided for constructing the litter sieves and/or liner. In the method, a generally flat two-dimensional sheet is provided. The sheet can be generally of a square, rectangular, and/or polygonal shape, which is cut to include a predefined shape having desired dimensions and features. For example, a flat, square sheet can be cut to define and irregular shape including sidewall main bodies, corner voids and respective overlap flaps as described herein. The sheet also can be cut to define the perforations and an optional hand opening. The sheet can be reconfigured from its irregular, two-dimensional flat form to a three dimensional form in which the sidewalls are angled upward relative to the base of the construction. When so configured, the overlap flap of a first sidewall main body can overlap and adjacent sidewall main body, and optionally at least a portion of a perforation associated with the same. The overlap flap can be fastened or secured to the adjacent sidewall main body, thereby completing a corner of the construction in joining the adjacent sidewalls with one another.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 3A is a close-up of a lock of a securing flange of the basin;

FIG. 3B is a close-up of a hinge of a securing flange;

FIG. 4 is a side plan view of the basin;

FIG. 17 is a top view of an alternative sieve for use with the litter disposal system;

FIG. 17A is a section view of an envelope of the alternative sieve, taken along lines 17A-17A of FIG. 17;

FIG. 17B is a close up of a first frangible element of an envelope of the alternative sieve, taken from area 17B, 17C of FIG. 17;

FIG. 17C is a close up of a second frangible element of an envelope of the alternative sieve, taken from area 17B, 17C of FIG. 17;

FIG. 21 is a close up view of the handle ribbon as second frangible elements of the sieve are being stressed to failure and breaking to release additional portions of the handle ribbon from the envelope under the force of pull by the user;

FIG. 22 is a close up view of the handle ribbon after all the second frangible elements of the sieve are broken, with the handle ribbon pulling up and raising the sieve;

FIG. 22A is a section view of an end of the envelope where the handle ribbon is anchored, taken along lines 22A-22A of FIG. 22;

DETAILED DESCRIPTION OF CURRENT EMBODIMENTS

Figure 1:
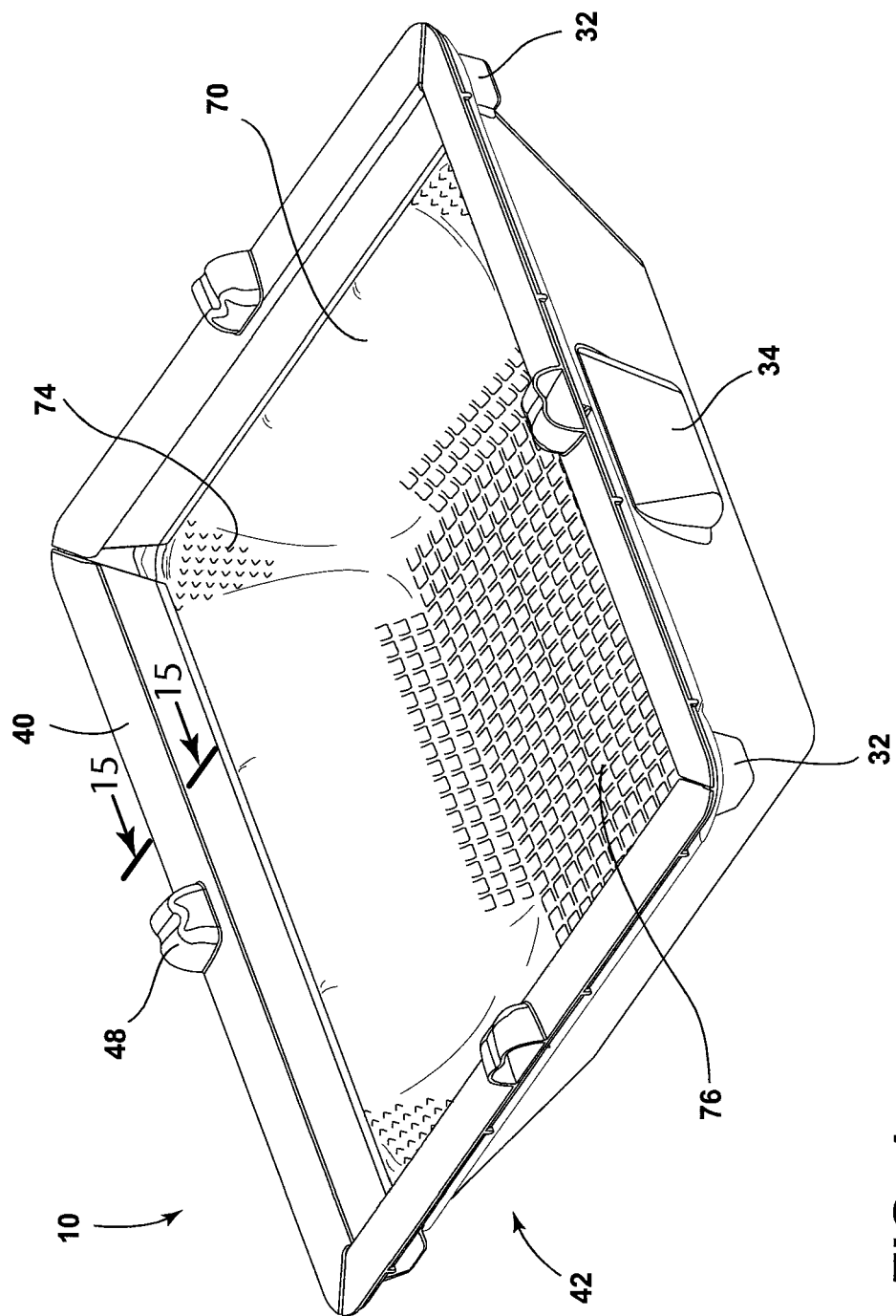
FIG. 1 is a top perspective view of the waste disposal apparatus of a current embodiment.
Figure 2:
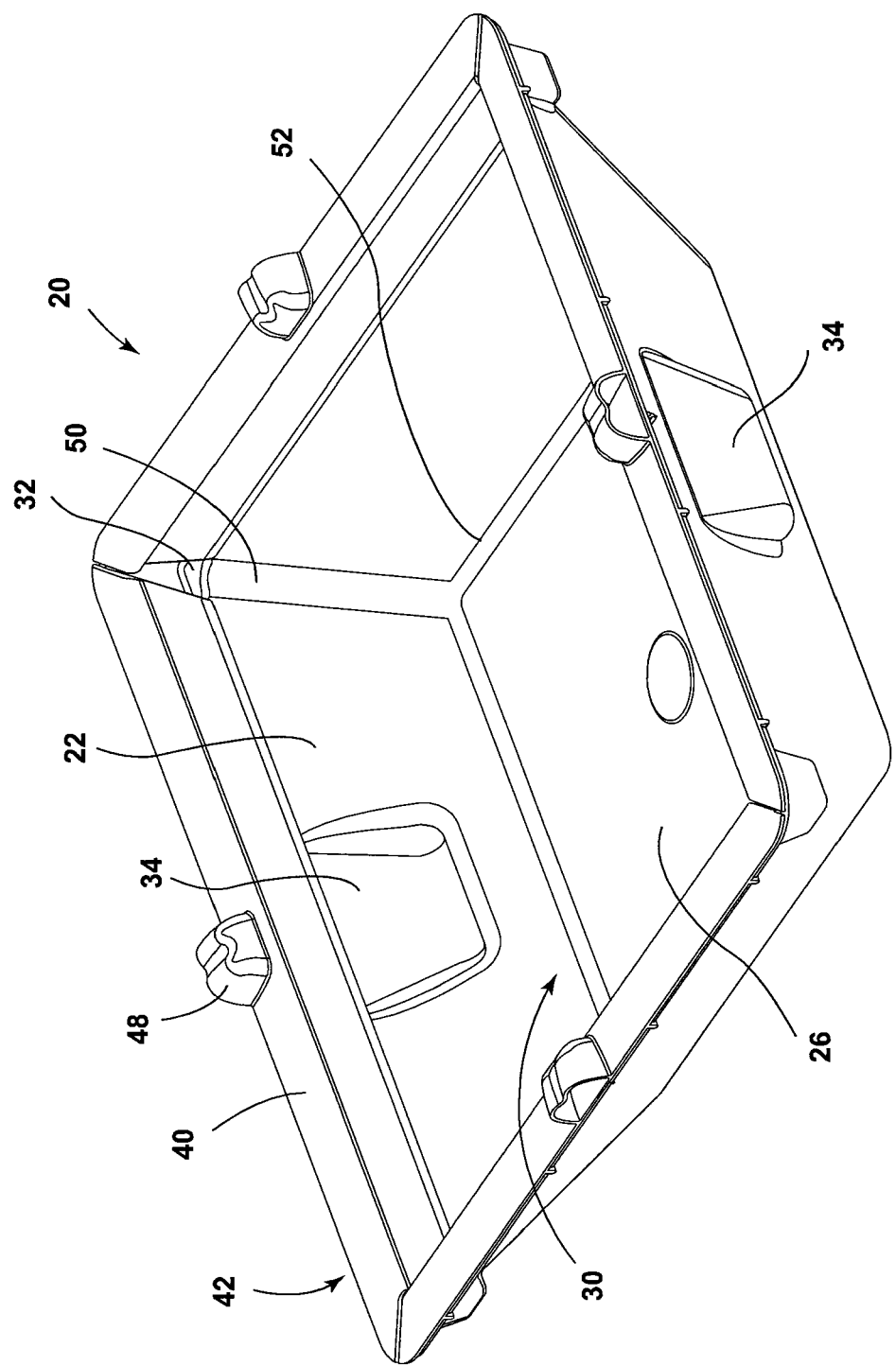
FIG. 2 is a top perspective view of the basin of the current embodiment.
Figure 13:
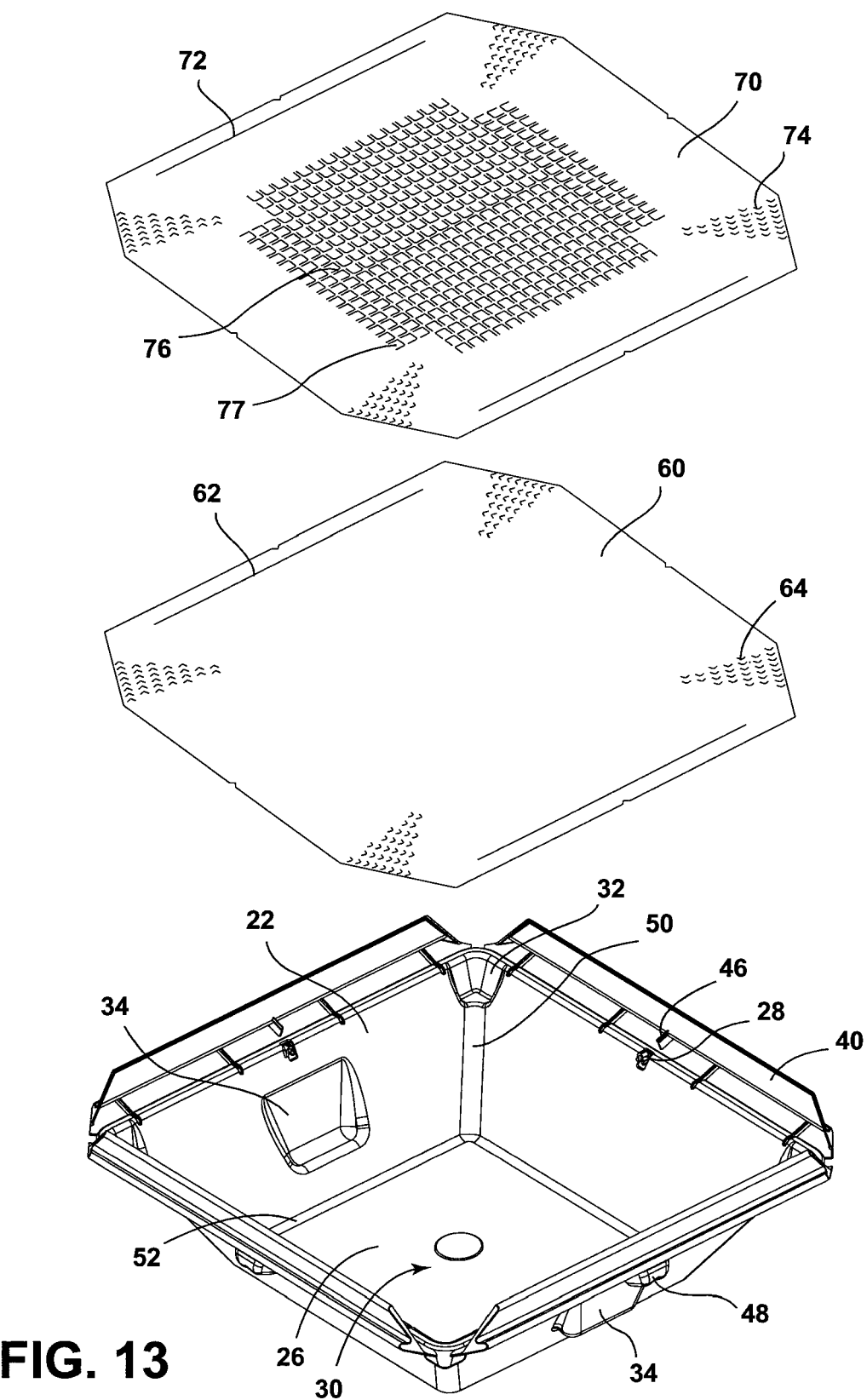
FIG. 13 is an exploded top perspective view of the waste disposal apparatus.

As shown in the embodiment illustrated in FIG. 1, reference number 10 generally designates a waste disposal apparatus. The waste disposal apparatus 10 generally includes outwardly canted sidewalls 22 and a base wall 26 forming a basin 20. As shown in FIG. 13, at least one liner 60 is disposed on the interior 30 of the basin 20, and a plurality of litter sieves 70 centrally arranged on the liner 60. The basin 20 is generally comprised of a plastic polymer material. The basin 20 also includes at least one handle protrusion 34 centrally located on at least one sidewall 22. A top portion 24 of the sidewall 22 includes a securing flange 40. The securing flange 40 is operable between an open position 44 (FIG. 3) and a closed position 42 (FIGS. 1 and 2). The securing flange 40 further includes a finger tab 48 configured to assist a user in moving the securing flange 40 from the open position 44 to the closed position 42 and from the closed position 42 to the open position 44.

FIG. 1 further shows the at least one liner 60 centrally disposed in the interior 30 of the basin 20. The plurality of litter sieves 70, are generally centrally arranged on the liner 60 and both the liner 60 and sieves 70 are secured in place by the securing flanges 40 when the securing flanges 40 are in the closed position 42. After the litter sieves 70 are secured in place, a user can insert litter into the interior 30 of the basin 20. Typically, up to ten sieves 70 are disposed on the liner 60. However, it is contemplated that more or less sieves 70 may be positioned on the liner 60. For example, 5-10 sieves and a single liner can be packaged and used together as a unit, installed in the basing, with individual sieves removed at intervals to remove animal waste deposited in the basin. Generally, as used herein, a removal element can refer to a liner and/or a sieve.

FIG. 2 shows the basin 20 having the liner 60 and litter sieve 70 removed. The basin 20 can include reinforced corners 50 of the sidewalls 22 and a reinforced area 52 surrounding the base wall 26 in order to provide additional structural support for the waste disposal apparatus 10. The basin 20 further has outwardly canted sidewalls 22 which are canted to provide an animal enough space to defecate or urinate, and to prevent the animal from removing litter from the basin 20 before, during or after the act of urination or defecation. The handle protrusions 34 are centrally disposed on at least one sidewall 22 of the basin 20, and on opposite sidewalls 22, to allow a user to easily pick up and move the entire apparatus 10. The handles 34 are configured to receive at least three to four fingers of a user and designed so that the underside of the handle 34, where the user will engage the handle with their fingers, remains clean and free of litter and other debris, such that the user can maintain clean hands.

Optionally, although the handles are shown as protrusions projecting outward from the base, they alternatively can be recessed into the interior of the basin. As an example, the handles can be recesses defined in the outer surfaces of the sidewalls. Of course, the handles in such a construction can be reflected into the interior of the basin, in which case they would project inwardly into the interior of the basin.

The illustrated basin 20 includes recessed top corners 32 as generally illustrated in FIGS. 4-7. The recessed corners 32 are designed such that during the stacking of a plurality of basins 20 during the manufacturing and shipment processes, the bottom of one basin 20 engages the recessed corners 32 of another basin 20 in order to provide secure stacking of the apparatuses 10 without damage to any feature of the apparatus 10. Additionally, the handles 34 define a recess on the interior 30 of the basin 20. The recess is configured to receive a handle protrusion 34 of a second basin 20 during the stacking process for manufacturing and shipment purposes. The handles of stacked adjacent basins can interfit within one another to enable the basins to efficiently nest in the stacked configuration. This can result in supplies of multiple basins taking up less space, and generally being easier to handle and ship.

Figure 3:
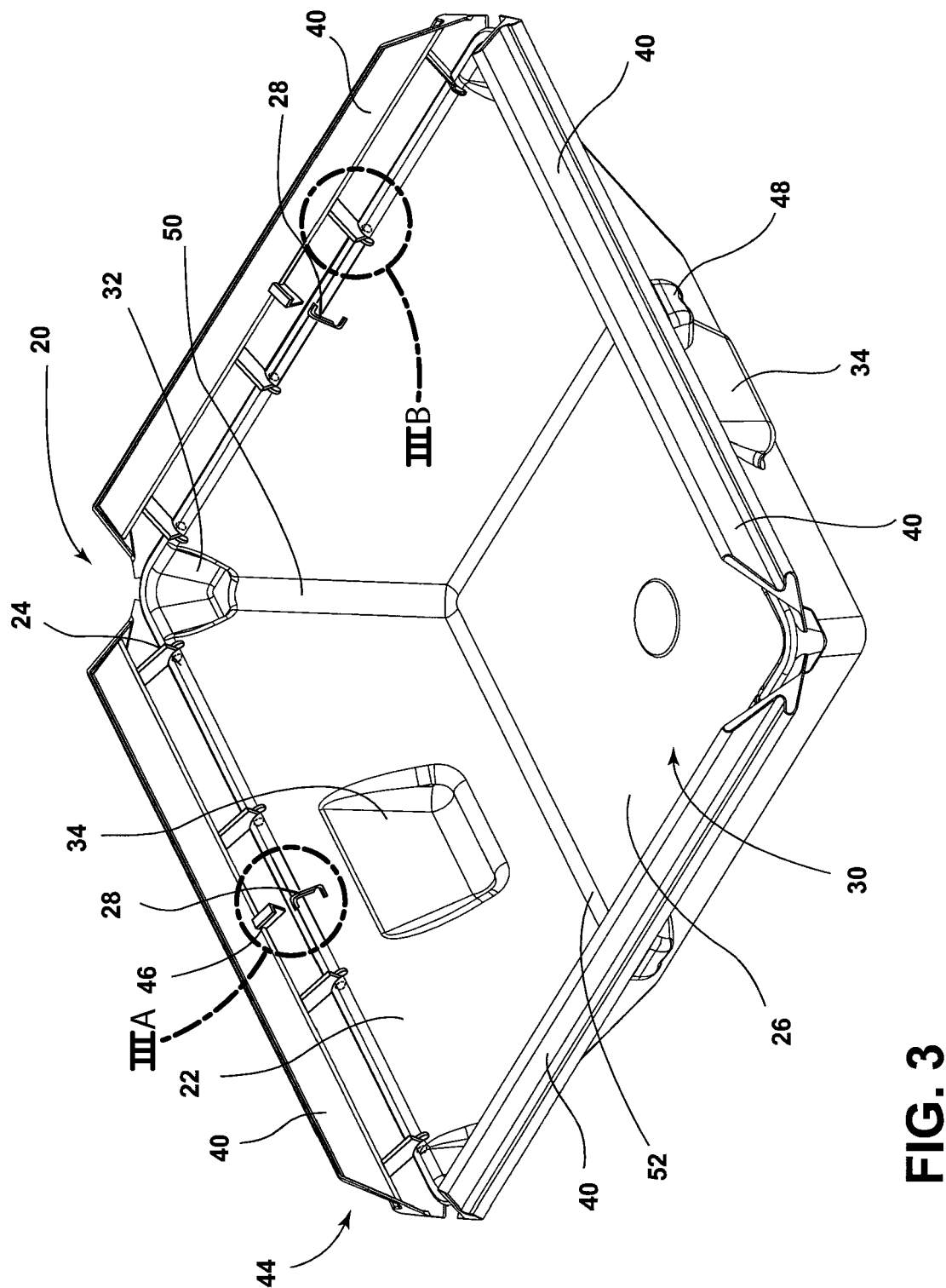
FIG. 3 is a top perspective view of the basin.
Figure 5:
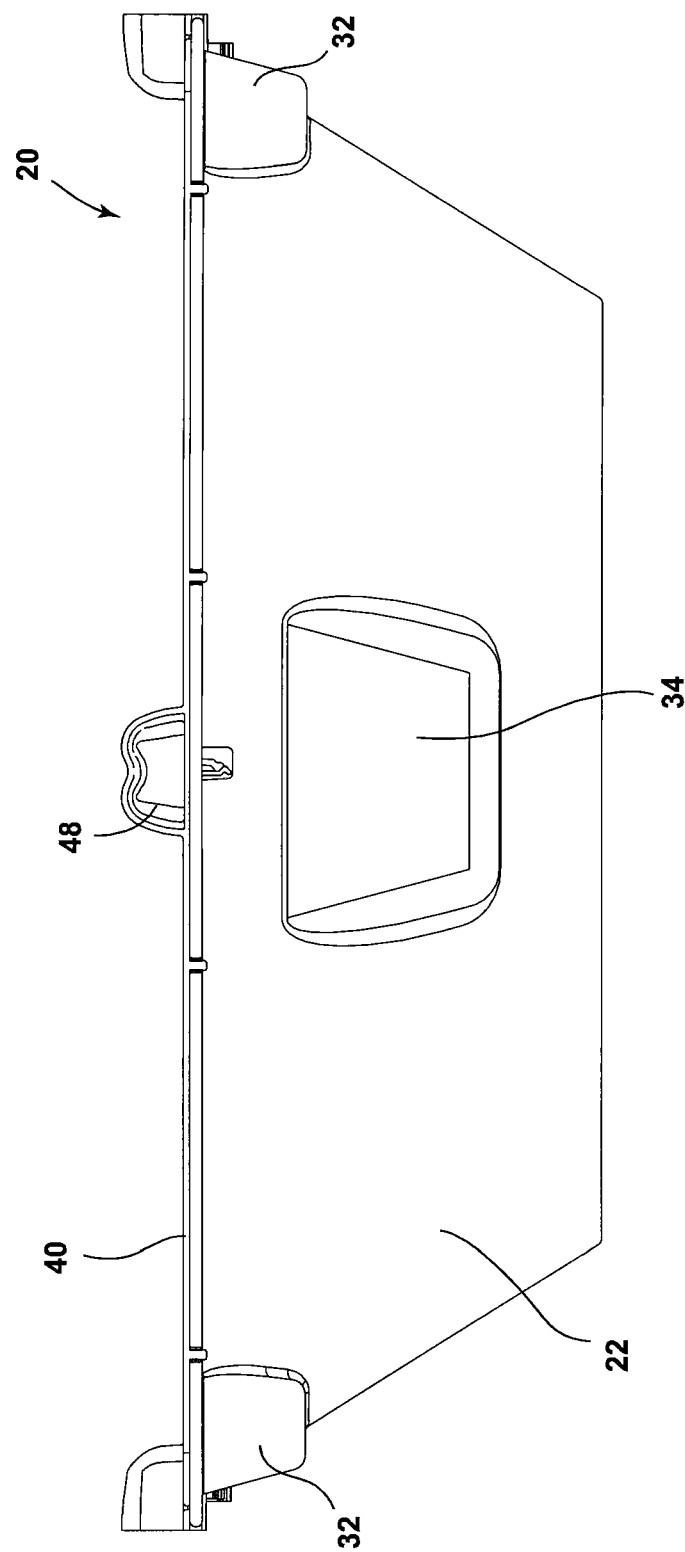
FIG. 5 is another side plan view of the basin.
Figure 6:
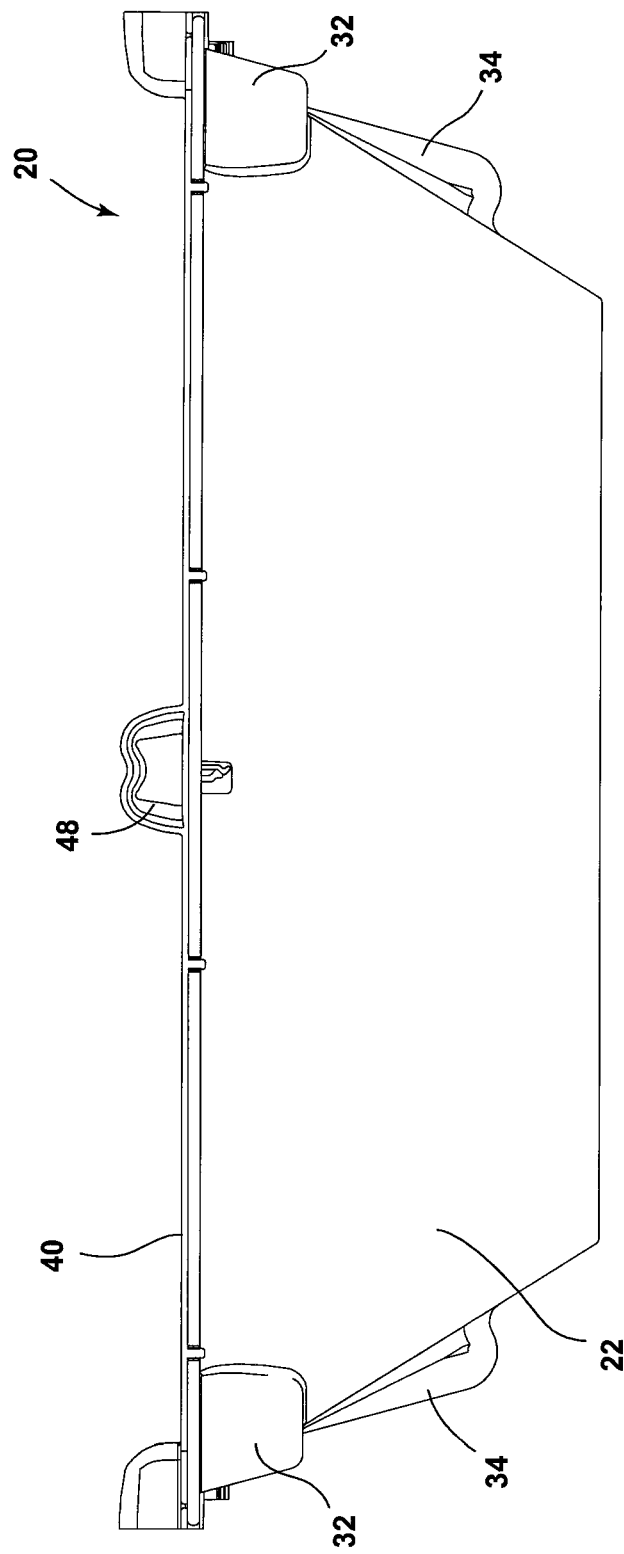
FIG. 6 is yet another side plan view of the basin.
Figure 7:
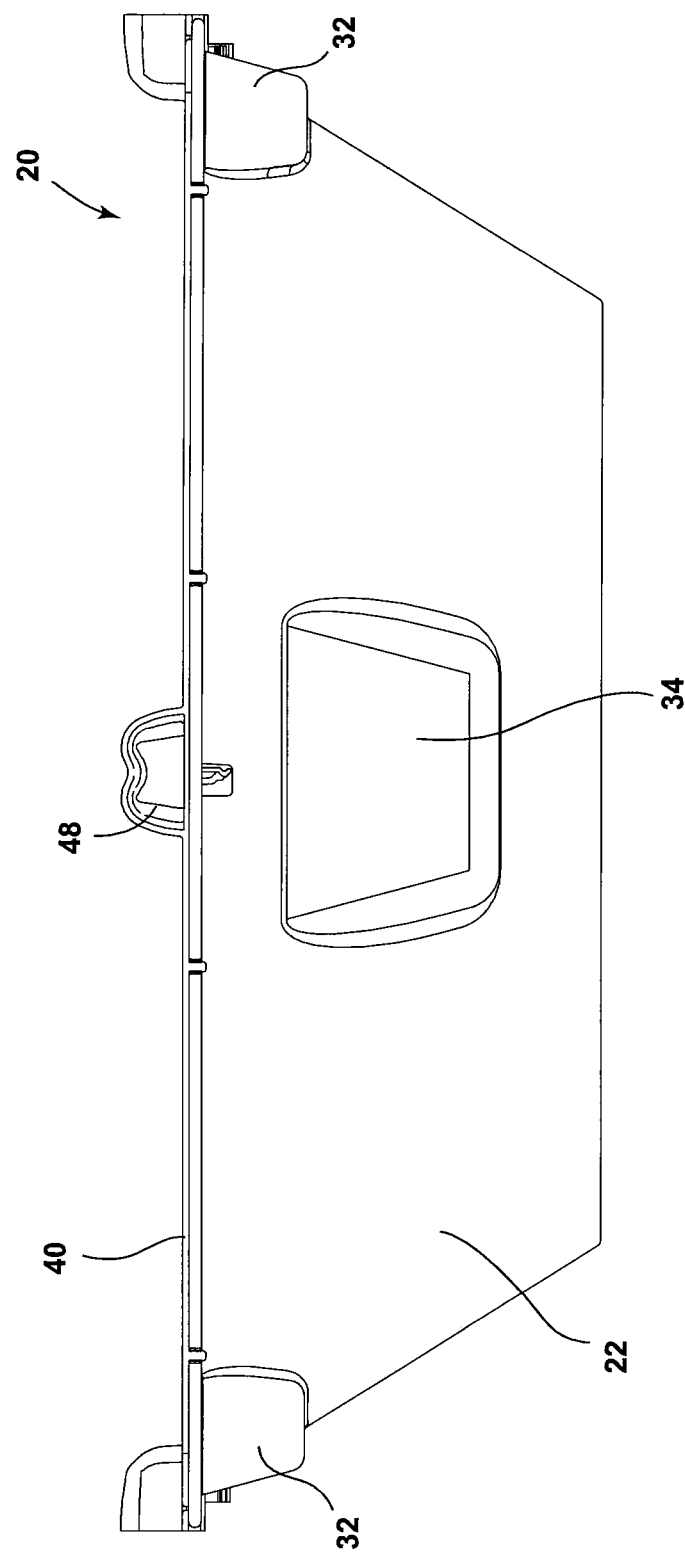
FIG. 7 is another side plan view of the basin.

FIGS. 2 and 3 show the securing flanges 40 in the closed position 42 and in the open position 44, respectively. The securing flanges 40 are connected via a hinge and are configured to rotate open approximately 180°. The hinge may be a living hinge, piano hinge, etc. The flange 40 can optionally be integrally formed with the basin 20 and can have a folded portion configured to engage a top portion of the sidewall 22.

In another construction, shown in FIG. 3B, the flanges 40 can include a pivot plate 40P that is moveably and rotationally disposed in a recess 22R defined by an upper portion of the sidewall 22. The sidewall and/or flange can include a detent or other snap like configuration to rotatably and removably couple the pivot plate to the sidewall. Optionally, the pivot plate 40P can be disengaged from the recess 22R upon application of sufficient force. In this manner, the securing flange can be removed from the basin sidewalls and cleaned or replaced. After cleaning, or in the course of replacement, the pivot plate 40P can be reinstalled in the recess 22R to hingedly couple the flange to the sidewall.

The flanges 40 can be configured to cover an entire perimeter of the basin 20. The finger tab 48 of the securing flange 40 is configured to receive one, two or more fingers of a user to assist the user in moving the securing flange 40 to the open position 44 from the closed position 42, and to the closed position 42 from the open position 44. The finger tab 48 is generally configured to allow the user to operate the flange 40 and at the same time maintain clean hands. The flange 40 includes a male engagement tab 46, optionally centrally disposed on the flange 40 and configured to align with and engage a female engagement tab 28 located optionally on the interior 30 of the sidewall 22 when the flange 40 is in the closed position 42. It will be noted that the male engagement tab 46 could be positioned on the sidewall 22 and the female engagement tab 28 could be disposed on the flange 40. The engagement tabs 28 and 46 can be integrally formed with the basin 20 and the flange 40 and may be interference clips or any other type of snap closure. The engagement tabs 28 and 46 are configured to secure the flange 40 in a closed position 42. Optionally, the engagement of the tabs can emit an audible click or other noise to inform the user that the securing flange is indeed secure, and configured to hole the sieves and/or liner in a desired position.

With reference to FIG. 3A, the male engagement tab can include a tab base 46B and an end finger 46F generally disposed transverse to the base. The female engagement tab 28 can include a rounded or angled ramp 28R that transitions to a ledge 28L. When the flange 40 is closed, the base 46B and or finger 46F can resiliently move, bend or deform upon engagement with the ramp 28R until the end finger 46F clears the ledge 28L. Upon this clearing, the tensioned base moves the finger into the recess 28K adjacent the ramp, as shown in broken lines. Upon this movement, the finger or base may engage the ledge and audibly click or snap, indicating to a user that the flange is secure. This lock element thereby holds the securing flanges tight against the sieves and/or liner, sandwiching them between it and the interior of the basin or sidewall. Of course, a variety of other lock elements can be substituted for that above, depending on the application.

The securing flanges 40 can be configured to securely hold in place at least one liner and one or more litter sieves 70 at any one time. The securing flanges 40 can be further configured to reduce or eliminate the exit of litter from the basin 20 during an animal's covering of waste. Additionally, the securing flanges 40 are configured to be opened 44 or closed 42 in any order without interference from another flange 40.

Figure 15:
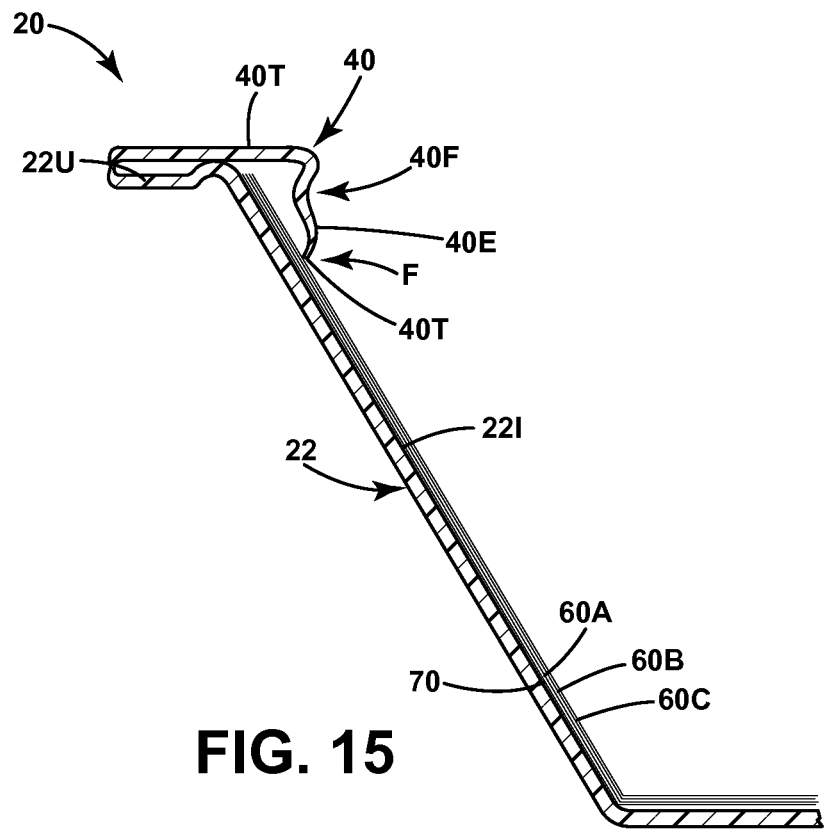
FIG. 15 is a section view of the basin and a securing flange, taken along lines 15-15 of FIG. 1 with many sieves disposed under an engagement flange.
Figure 16:
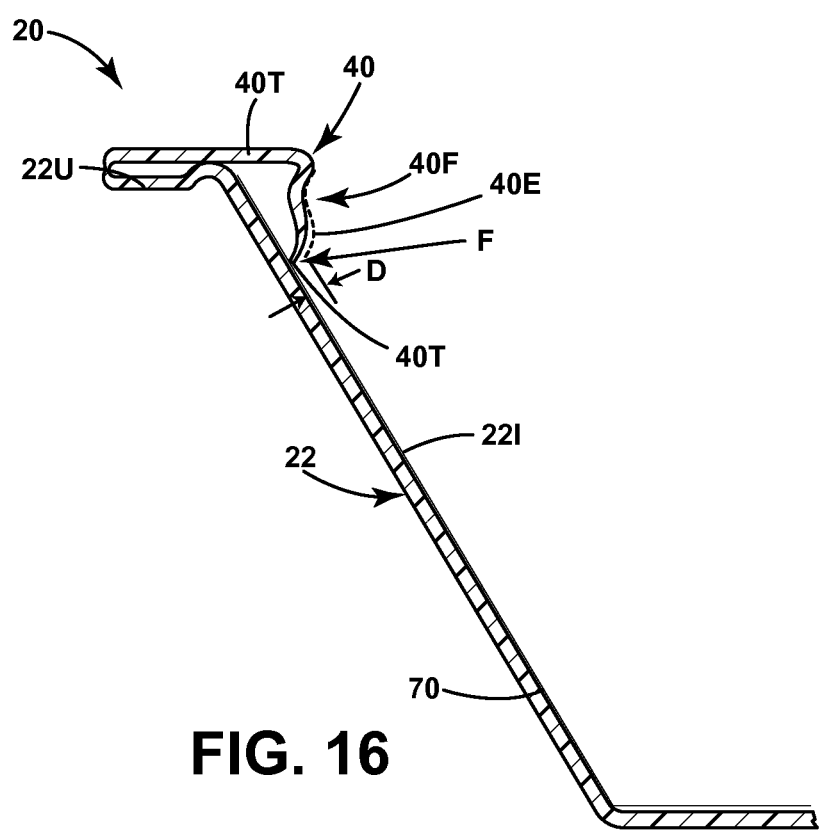
FIG. 16 is a section view of the basin and the securing flange, taken along lines 15-15 of FIG. 1 with fewer sieves disposed under the engagement flange.

In some embodiments, the securing flanges can include a flexing, resilient or moveable component to accommodate varying numbers of sieves disposed in the basin and secured by the securing flange. For example, with this component, the securing flange can secure both a large number of sieves (and a liner) between it and the basin sidewall, as well as a small number of sieves between it and the basin sidewall, where the large and small number of sieves provides different overall thicknesses. With reference to FIGS. 15 and 16, the securing flanges 40 can include an upper or top plate 40T. This generally forms the uppermost part of the securing flange when in the closed position. The top plate 40T also is disposed immediately adjacent the upper ledge 22U of the basin sidewalls when the securing flange is in the closed position. The top plate 40T transitions to a flexing region, line or point, collectively referred to as a flex element 40F along a face of the securing flange 40. The flex element 40F moveably, resiliently and/or flexibly couples the engagement flange 40E to the top plate 40F. The engagement flange 40E can include an engagement portion or tip 40T located optionally distal from the flex element 40F. The engagement tip 40T can be disposed at a first distance from the sidewall 22 when the liner and several sieves, for example 3-10, are disposed between the engagement tip and the sidewall. The engagement tip 40T also can be disposed at a second distance from the sidewall 22 when the liner only and/or a few sieves, for example 1-5, are disposed between the engagement tip and the sidewall. The second distance can be less than the first distance.

Optionally, the engagement flange 40E can be rounded or angled. This can enable or assist the engagement flange in flexing outwardly when the flange or tip engages a large number of sieves, or thicker sieves in general, for example, as shown in FIG. 15.

Figure 8:
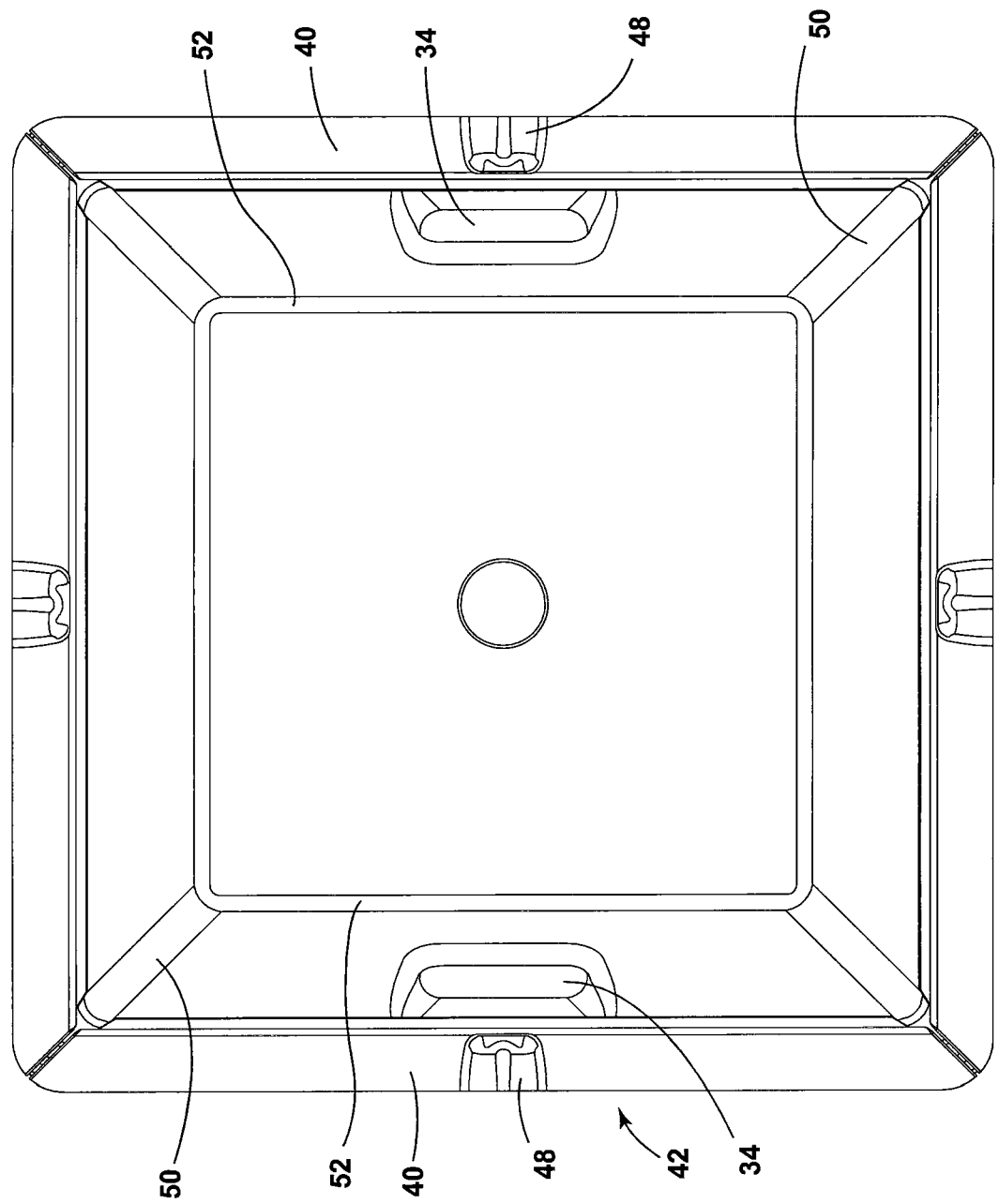
FIG. 8 is a top plan view of the basin.
Figure 9:
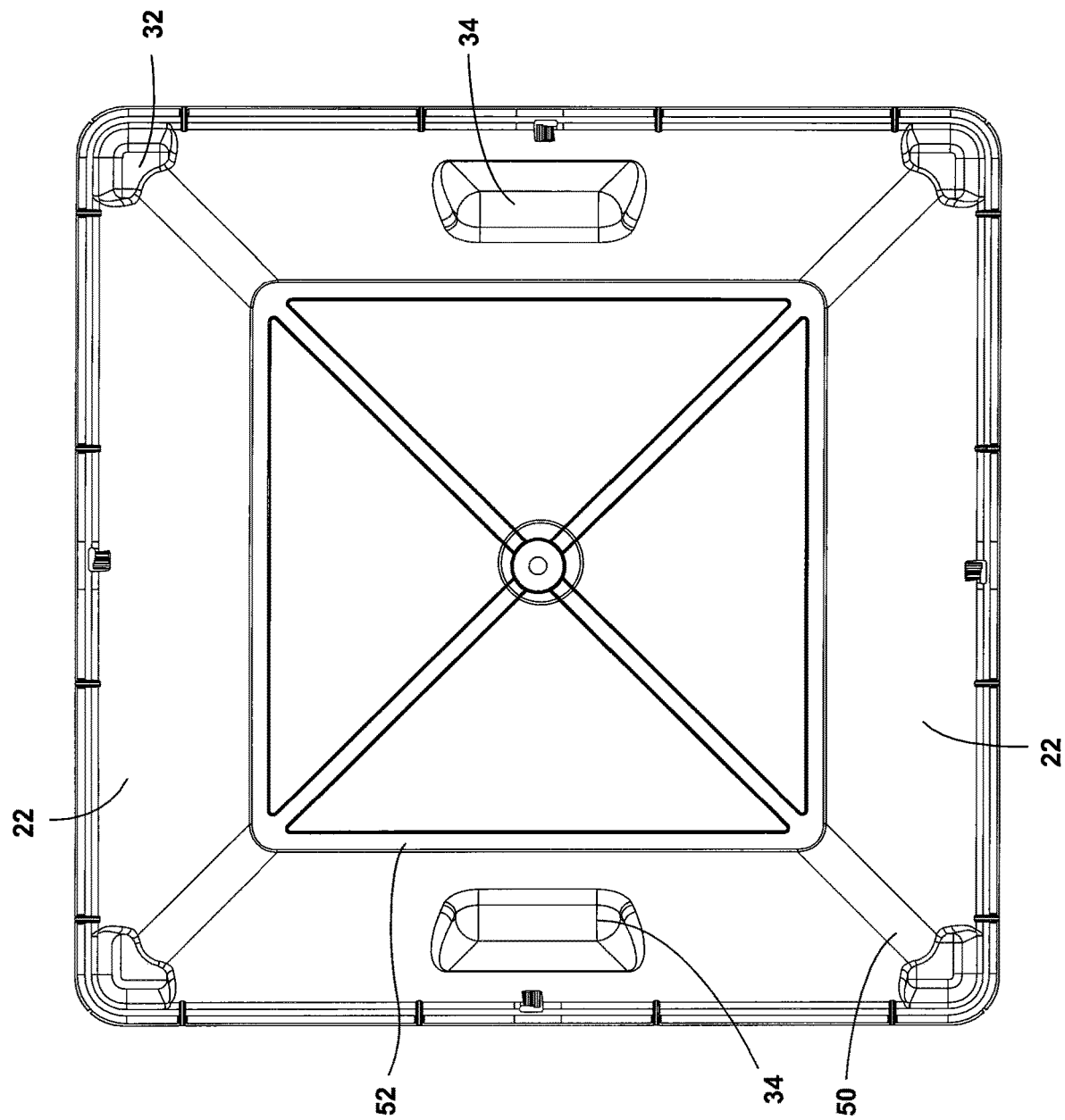
FIG. 9 is a bottom plan view of the basin.
Figure 10:
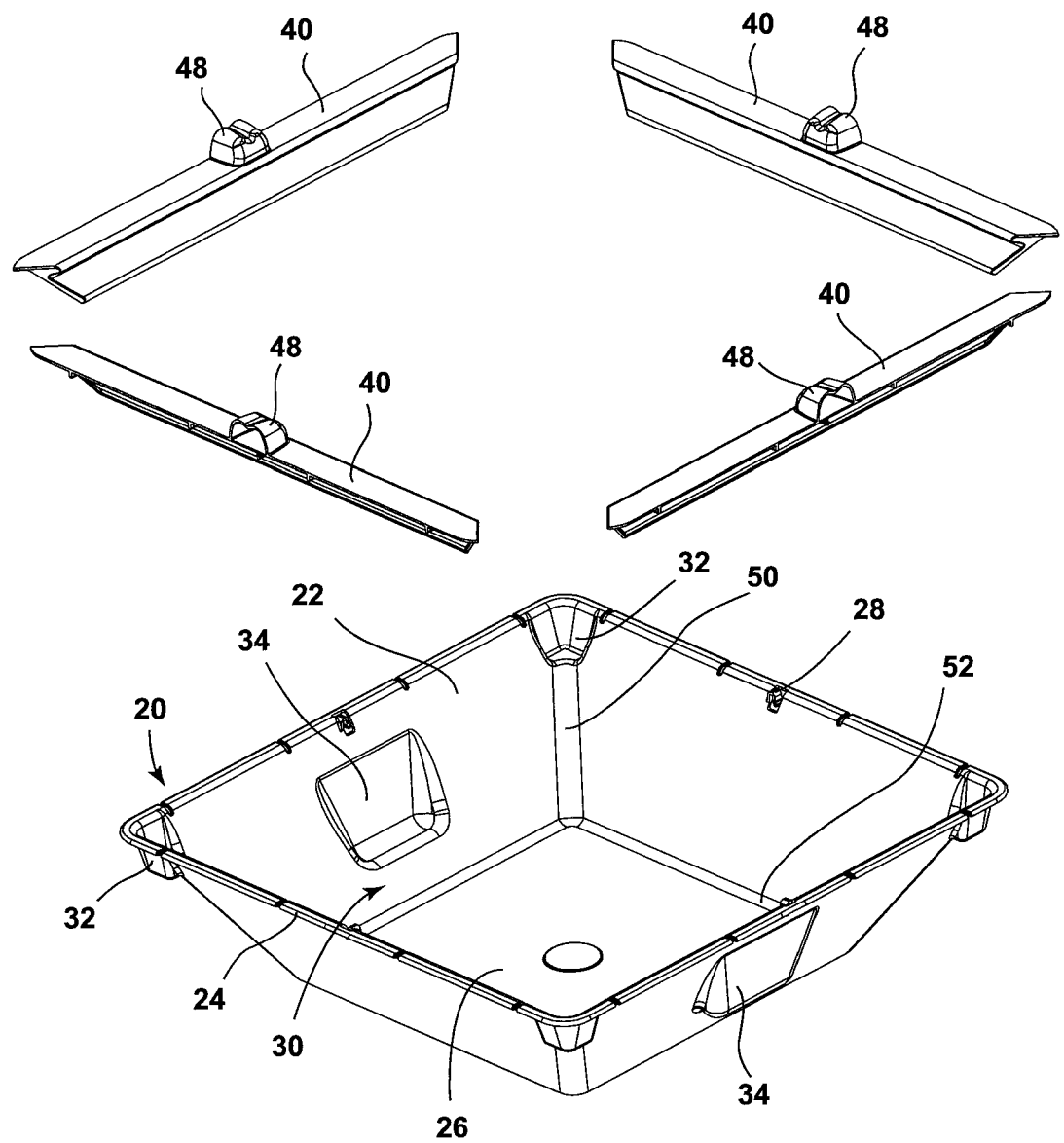
FIG. 10 is an exploded perspective view of the basin.

As shown in the embodiment illustrated in FIG. 8, and described above, the handles 34 of the basin 20 can be recessed on the interior of the basin 20 to provide safe and secure stacking of multiple basins 20. FIG. 9 shows the bottom of the basin 20 having a flat bottom surface and handle protrusions 34 on the sidewalls 22. FIG. 10 shows an exploded view of the basin 20 having the securing flanges 40 removed.

Figure 11:
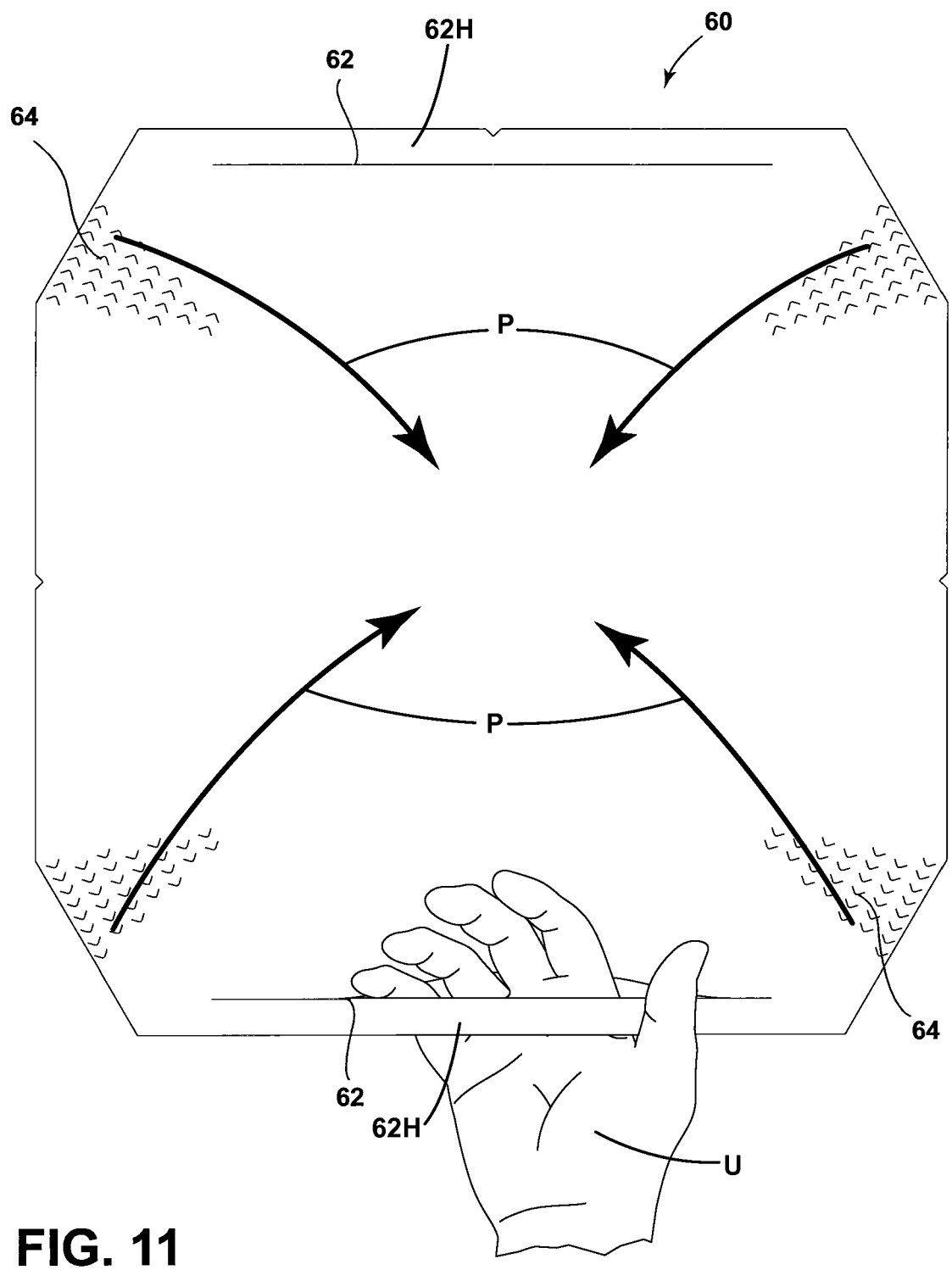
FIG. 11 is a top plan view of a liner of the current embodiment.

FIG. 11 shows the liner 60 of the waste disposal apparatus 10. The liner 60 can be generally square in shape having each corner of the square cut off to provide a generally eight sided shaped liner 60. Of course, other configurations, two and/or three dimensional, can be selected for the construction of the liner. For example, in some cases, the liner can be constructed so that if it was self-supporting it would be in the shape of a truncated, square pyramid, turned upside down and hollowed out.

Optionally, the liner 60 can be constructed from a polypropylene plastic material, however, a variety of different materials can be used, such as other polymers, Mylar, Tyvek® house wrap, mesh, and other films or sheet like materials. As shown in FIG. 11, the liner 60 can include a plurality of holes, optionally vacuum perforations, 64 disposed in each of the corners of the liner 60. The liner 60 can further include one or more handle slits 62 configured to allow a user to easily remove the liner 60 when desired, while keeping the hands of the user clean. As an example, a user may place their hands U through the opposing slits 62 to achieve a handled hold on the liner 60. In this manner, a user can then lift the liner from the basin, carrying with it the litter previously disposed in the basin. As the liner is lifted, the movement of the handles 62H upward, and the weight of litter and possibly waste on the liner pulling downward, causes the corners of the liner to move inward in direction P, generally toward the center of the liner, all while the liner folds and/or deforms upward and/or inward upon itself.

Optionally, the liner can be substantially free from openings, apertures or holes in the remainder of the liner so that litter material cannot be sifted or filtered using the liner. In this manner, the liner presents a final barrier between the litter/animal waste, and the bottom 2 and/or sidewalls of the basin. Accordingly, in many cases, the animal waste might not contact the interior of the basin, in which case, maintenance and cleaning of the basin can be facilitated.

Figure 14:
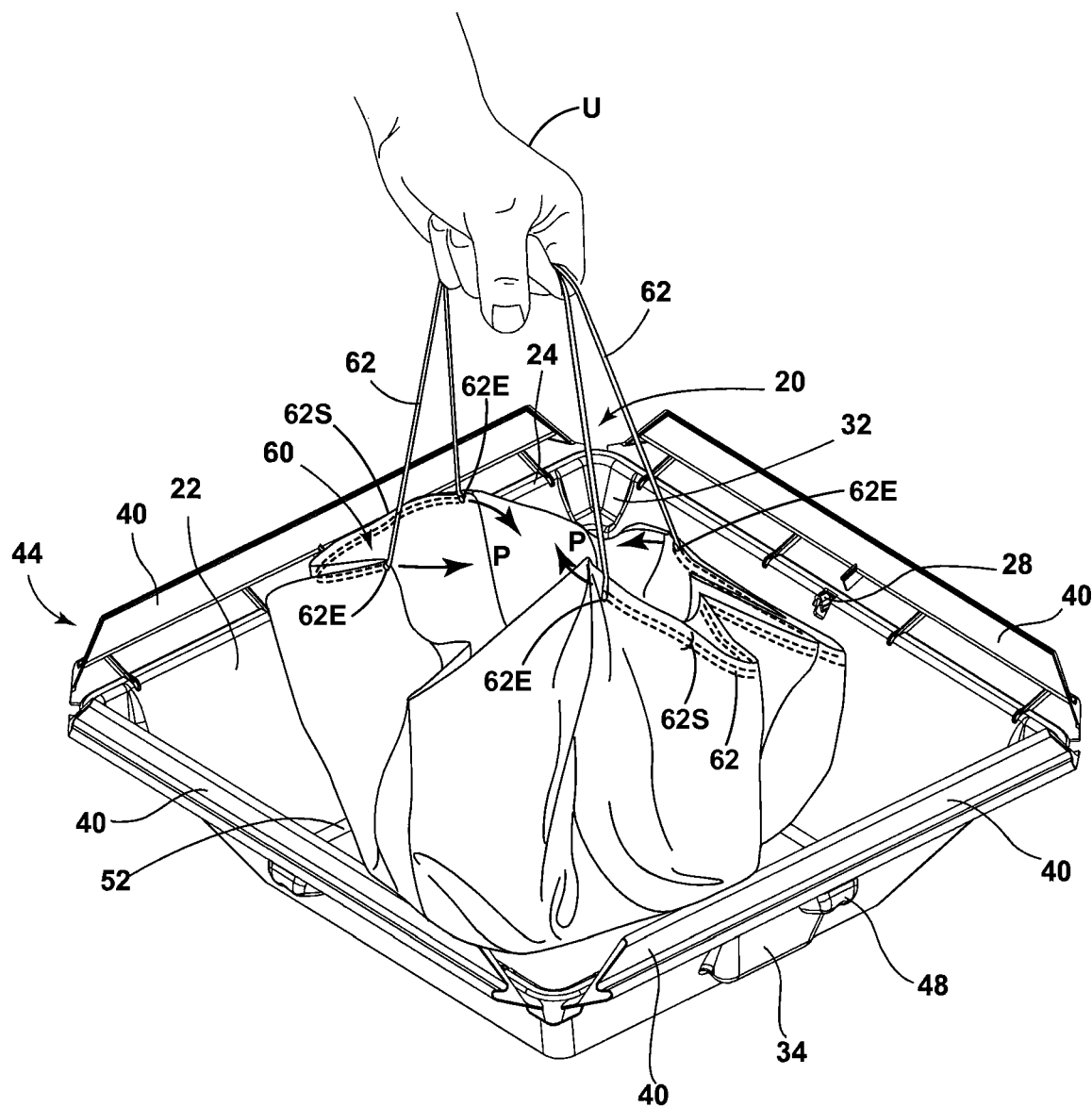
FIG. 14 is top perspective view of one embodiment of the waste disposal apparatus.

In an alternate embodiment, shown in FIG. 14, the handles 62 can be string handles extending from the liner 60. The string handles can be any type of handle constructed from string, rope, ribbon, cord, wire, or other elongate elements. The string handles can be configured so that they can be brought together, generally engaging one another, above the liner to lift the liner 60 from the basin 20. The string handles can be moveably and/or slidably disposed in sleeves 62S defined by the respective edges of the liner 60. The sleeves can be formed by folding the ends or edges of the liner over upon themselves, and securing this configuration with stitching, hot welding, fasteners or other constructions.

When the string handles are pulled upward by a user U as shown in FIG. 14, the string handles slide and/or move relative to the sleeves 62S within which they are disposed, with more and more of the string handles drawings out from the sleeves to expose more of the string handles. This action can bunch the liner between the points of engagement 62E (which are in the form of holes in the sleeves 62S) of the string handles with the liner. As a result, the liner outer edges converge on one another to mimic a parachute type configuration, with litter and waste in the liner drawing down on the liner (optionally near its center LC), and further cinching the string handles relative to the liner edges. Optionally, the above liner characteristics and components, such as the string handles, sleeves, points of engagement, center and the like can be similarly implemented in the sieves.

If desired, the corners can be removed from the liner 60. This can enable the liner 60 to be flush with the interior 30 of the basin 20 and not have extra liner 60 material gathered or bunched at the corners of the basin 20 so that those bunched liner parts remain uncaptured by the securing flange. The removed corners can further provide the parachuting action of the liner 60 when it is removed from the basin 20 by the handle 62. The parachuting action can enable the waste and used litter to maintain a position inside the liner 60 and can facilitate easy clean up and disposal.

Figure 12:
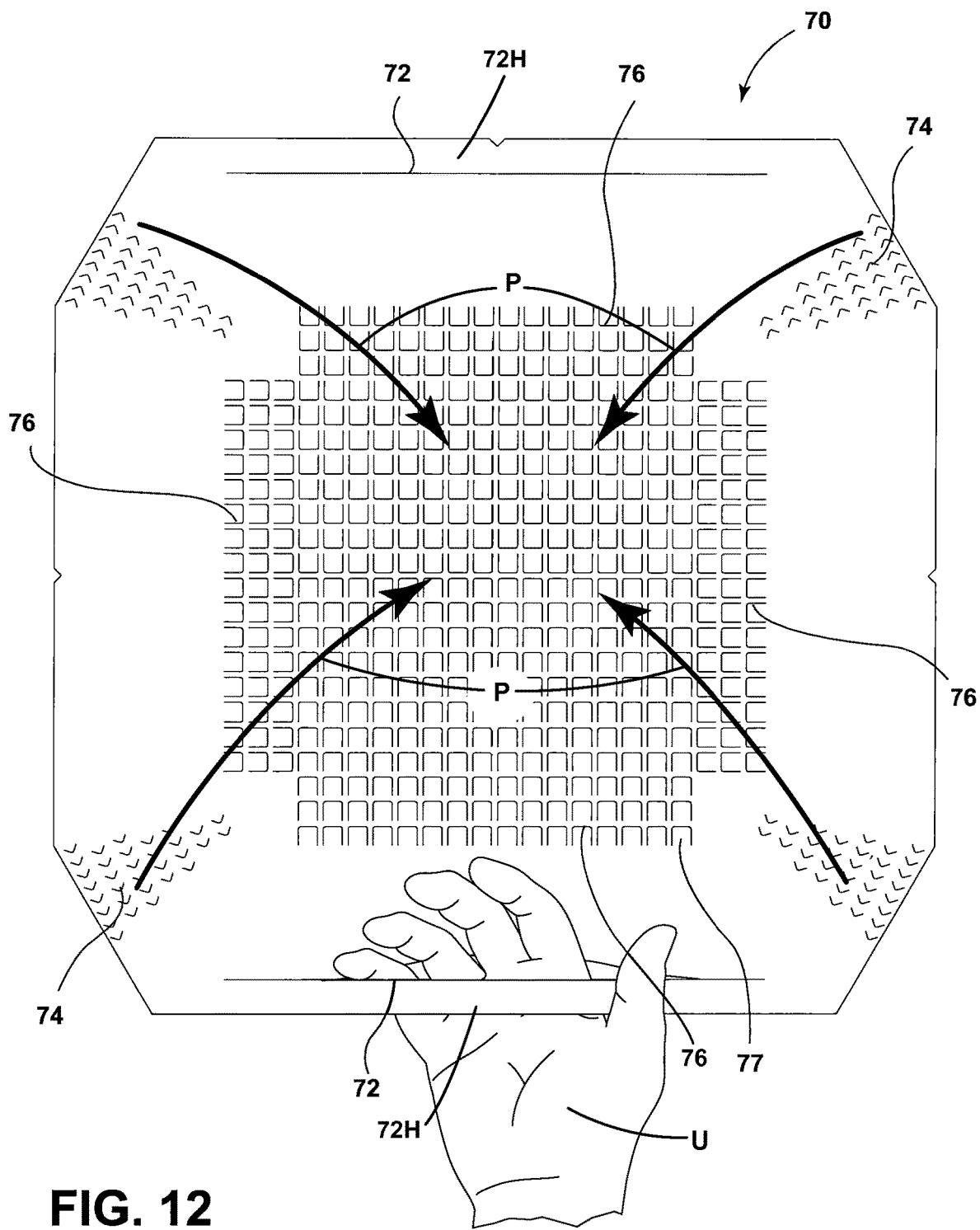
FIG. 12 is a top plan view of a litter sieve of the current embodiment.

FIG. 12 shows the litter sieve 70 of the waste disposal apparatus 10. The litter sieve 70 is generally comprised of a polypropylene material, however, a variety of different materials can be used, such as other polymers, Mylar, Tyvek® house wrap, mesh, and other films or sheet like materials. Similar to the liner 60, the sieve 70 can be configured in a generally square configuration with each of its four corners cut out or removed to provide an eight sided sieve 70. Of course, other configurations, two and/or three dimensional, can be selected for the construction of the sieves. For example, in some cases, the sieves can be constructed so that if they were self-supporting they would be in the shape of a truncated, square pyramid, turned upside down and hollowed out.

The litter sieve 70 can further includes handle slits 72 defined on opposing sides of the litter sieve 70, similar to the handles of the liners described above. Optionally, in an alternate embodiment, the handles 72 may be string-like handles extending from the sieve 70 and are configured to be brought together by a user to lift at least one sieve 70 from the basin 20. Moreover, the handles 72 are configured to be hidden behind the liner 60 when not in use. Again, during removal the litter sieve 70 is configured to form a parachute like structure allowing the waste and used litter to stay inside of the parachuted litter sieve 70 during removal and disposal of the sieve 70. As a sieve is lifted individually, the movement of the handles 72H upward, and the weight of litter and possibly waste on the sieve pulling downward as the litter sifts through the holes 76, causes the corners of the sieve to move inward in direction P, generally toward the center of the sieve, all while the sieve folds and/or deforms upward and in upon itself.

The litter sieve 70 further includes a plurality of holes 76. In the embodiment shown in FIG. 12, each hole 76 is generally cut on three sides to form a rectangular flap 77. The cuts are made in different directions based on the location of the hole 76, and are configured to allow the maximum amount of clean litter through the flap while maintaining any waste on the surface of the sieve 70. The flaps 77 are configured to open with the pressure of clean litter disposed on top of the sieve 70. The holes 76 are specifically designed such that during the sifting process the maximum amount of clean litter falls through the sieve 70 to be used again during operation of the waste disposal apparatus 10. The holes 76 are generally arranged in a plus sign configuration having each of the flaps generally facing towards the center of the sieve 70. When litter is disposed on top of the sieve 70, the hole flaps 76 are closed and none of the holes 76 are visible above the litter line. Additionally, the sieve 70 can include a plurality of vacuum perforations 74 disposed in each corner corresponding to the vacuum perforations 64 of the liner 60. Optionally, other shapes can be used to form the holes 76. For example, the holes 76 can be completely open, without any flaps or the like. In such cases, different aesthetic shapes can be used for the holes, such as circular, elliptical, rounded, polygonal, triangular, trapezoidal, and combinations of the foregoing.

In operation, the waste disposal apparatus 10 is configured to allow the user to keep clean hands during set up of the apparatus 10 and disposal of pet waste. The basin 20 is configured to start with its securing flanges 40 in the open position 44. Next, at least one liner 60 is disposed centrally on the basin 20. A plurality of litter sieves 70 are disposed on top of the liner 60. The litter sieves can be layered one upon the other, and upon the liner as well. The securing flanges 40 are moved to the closed position 42 in order to secure the liner 60 and the litter sieves 70 in place in the basin 20. As the securing flanges move to the closed position, the male 46 and female 28 engagement tabs can engage one another, and as described above can audibly clip or snap to inform the used that the securing flange is locked in position. Optionally, as illustrated in FIG. 15, the engagement flange 40E can move so that the flange flexes or moves about the flex element 40F, clamping or sandwiching the liner and sieves between the flange and the interior of the sidewall 22. This, in turn, supports the upwardly extending portions of the liner and sieves so that they do not slide down the sidewalls of the basin.

With the liner and sieves installed in the basin and generally secured, clean litter can be added to the basin 20, completely covering all of the holes 76. The litter also generally covers the parts of the topmost sieve extending up the sidewalls up to the securing flanges. When it is time for the waste disposal apparatus 10 to be cleaned and waste removed, a user engages the securing flanges 40, and generally the handles 48. The user pushes the flanges back into the open position 44 (FIG. 3) using the handles 48, all while the securing flanges rotate or move about a respective hinge or other element. Upon initial movement, the male and female engagement tabs also disengage from one another, thereby "unlocking" the securing flange so that it can move to the open position.

To remove a sieve, the user engages the handles 72 of at least one litter sieve 70. The user than sifts out clean litter through the three sided flaps 77 which open under the weight of the animal waste and unused litter passes the flaps 77 and falls through the holes 76 onto the next sieve 70 still located within the basin 20. The animal waste remains in the sieve. Where the flaps are absent, and the holes 76 are simply open in other embodiments, the unused litter sifts through those holes, and the animal waste remains in the sieve.

After the animal waste is sieved, the handles 72 of the sieve 70 are joined together forcing the litter sieve 70 into a parachute-like configuration which allows the animal waste to stay safely inside of the sieve 70 and to not come in contact with a user. The litter sieve 70 is then disposed of, for example in a composter or in a suitable waste collection device. This process can then be repeated until all of the sieves 70 are used. Additional sieves 70 can be added when desired by a user.

Another embodiment of the sieves for use with the current embodiments or alone is shown in FIGS. 17-23 and generally designated 80. The construction, functionality and operation of this sieve can be implemented in a liner. Generally, in such a construction, the liner can differ from the sieves described below in that the base or bottom wall of the liner might not include holes, apertures or other perforations that allow material to drain or sift through the base or bottom wall. All the other components can be the same and therefore the construction of such a liner will not be described again here.

Turning to FIGS. 17 and 17A-17B, the litter sieve 80 can include a base 80B which generally forms the bottom thereof. To the base 80B, multiple sidewalls 80S1, 80S2, 80S3 and 80S4 can be joined. Generally, the sidewalls can extend upwardly and away from the base, particularly when the sieve 80 is disposed in a basin and the sidewalls of the basin support the respective sidewalls of the sieve. Although shown as including only four sidewalls, additional sidewalls can be added, or some sidewalls can be deleted. Further, the sieve can include a continuous sidewall. As shown, the sidewalls can be joined at corners 80C. Optionally, the sidewalls can be longer or of a larger dimension at their tops. For example, top 80S4T can be longer than the bottoms 80S4B. In this manner, the sidewalls can generally form trapezoidal or non-rectangular shapes.

At their ends, each sidewall can be joined with adjacent sidewalls via the corners 80C. Optionally, the sieve 80 can be constructed as a flat two-dimensional planar sheet with completely open holes 80H formed therein. Triangular shapes can be removed from each of the corners of the flat planar sheet. The remaining ends of the sidewalls can be tacked, sealed or otherwise joined with one another to form a three dimensional shape, optionally in the form of a truncated upside down pyramid. Alternatively, the sidewalls 80S1, 80S2, 80S3, 80S4 can be integrally formed with one another and the bottom 80B in a mold that is in the final desired three dimensional shape of the sieve, which mimics the interior of a basin within which the sieve is disposed in use.

This sieve 80 can be constructed from the same materials as the sieve and/or liner mentioned above. The configuration of the holes 80H in the base 80B can be of a plus (+) shape. Optionally, the holes 80H are defined substantially only in the bottom or base 80B, without extending up into or being defined by the respective sidewalls of the sieve 80.

One or more of the sidewalls can include one or more envelopes within which one or more handle ribbons are disposed. For example, as shown in FIG. 17, the first sidewall 80S1 and the second opposing sidewall 80S2 can define first and second envelopes 80E1 and 80E2, respectively. These envelopes can generally be similar or identical in structure, along with the handle ribbons disposed in them. Further, although shown as being disposed only on opposing sides 80S1 and 80S2, the envelopes 80E1 and 80E2 can be continuous, for example, additional envelopes can be formed in sidewalls 80S3 and 80S4 so that the first and second handle ribbons are connected to one another and form a continuous loop extending around the entire sieve.

With reference to FIGS. 17, 17A, the envelopes and handle ribbons will now be described in more detail. It should be noted that the second envelope 80E2 and second ribbon 82 can be identical to that of the first envelope 80E1 and first ribbon 81. Thus, the second envelope and second ribbon will not be described again here. To begin, the first envelope 80E1 can be disposed at an uppermost portion of the sieve 80. Optionally, the envelope 80E1 can be disposed so that it faces and forms at least a portion of an outside lateral edge 80L of the respective sidewall. The envelope 80E1 can form an interior cavity 80C1 as shown in FIG. 17A. This interior cavity can be formed by a top panel 80T that is adjacent and/or disposed a preselected distance from a bottom panel 80B. The top panel 80T and 80B can be separate components or they can be integrally formed. For example, the top panel 80T can be continuous with the bottom panel 80B with the bottom panel simply being folded back against the sidewall 80S1 and/or top panel and secured directly to the sidewall 80S1 and/or top panel. This may be achieved via tack welding, heat welding, gluing or otherwise securing the bottom panel 80B to the top panel 80T and/or sidewall 80S1. The top panel 80T and bottom panel 80B each include interior surfaces that generally face toward and form the first interior cavity 80C1. This first interior cavity 80C1 can run the entire length of the sidewall 80S1 along the lateral edge 80L.

Figure 18:
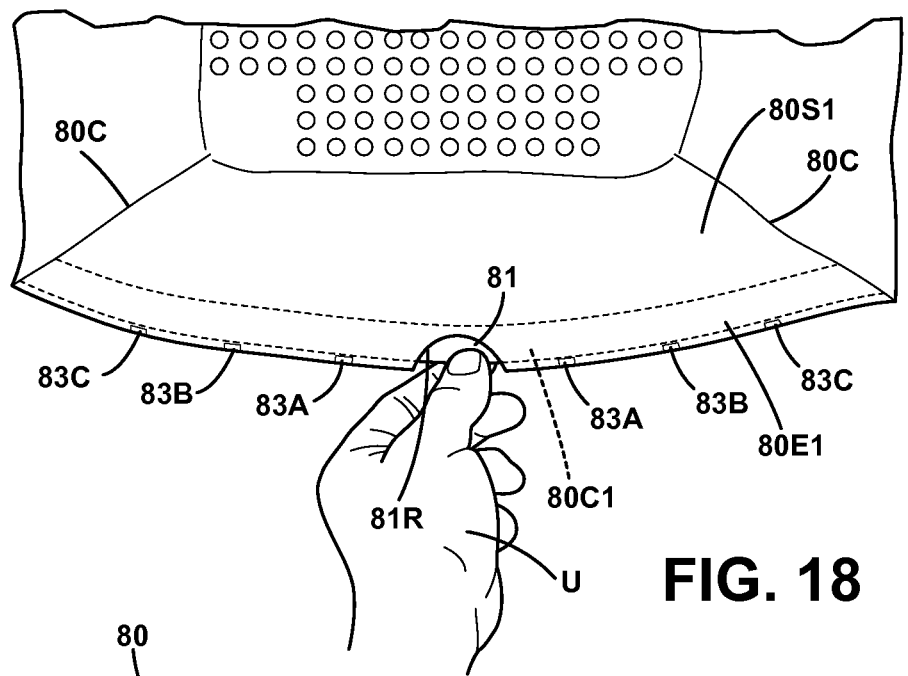
FIG. 18 is a top view of the handle ribbon of the alternative sieve being initially engaged by a user, before any frangible elements of the sieve are broken.

As shown in FIGS. 17 and 18, the interior cavity 80C1 and the envelope in general 80E1 can be open with the envelope 80E1 forming an access recess 81R. This access recess can be utilized so that a user U can grasp and access the first handle ribbon 81 disposed within the envelope 80E1 and generally within the interior cavity 80C1. The recess 81R can be in the form of a rounded opening so that a user can grasp the upper and lower surfaces of the handle ribbon 81, pinch it and pull it through the recess 81R, generally so that the handle ribbon 81 exits and/or is removed from at least a portion of the envelope 80E1 and the interior cavity 80C1 as described in further detail below.

With reference to FIGS. 17A-17B, the first and second envelopes can include one or more frangible elements 83. These frangible elements 83 can be disposed along the outer lateral edge 80L and can form a portion of the closure of the respective envelopes 80E1 and 80E2. The frangible elements generally can be configured so that they fail, break, or otherwise become partially destroyed upon the application of a preselected force to the respective handle ribbon and/or the respective envelope. As an example, when a user exerts a preselected force, above about 2 lbs. to the handle ribbon, thereby pulling it through the access recess 81R, 82R, the frangible elements can break, snap or otherwise fail to allow more of the respective handle ribbon to be pulled from and removed from the respective envelope and/or interior cavity.

A variety of different frangible elements can be used to facilitate this function. For example, as shown in FIG. 17B, the outermost lateral edge 80L of the envelope 80E2 can be perforated with multiple apertures 85. Between the apertures, the remaining portion of the panels that join with one another can form the frangible elements 84A and 84B. A first frangible element 84A can be adjacent the access recess 82R. A second frangible element 84B can be separated from the first frangible element 84A by a perforation 85. Subsequent frangible elements connecting the respective top and bottom panels of the envelope 80E2 can form third and fourth frangible elements and so on. The number of frangible elements can be selected depending on the breaking force desired to pull the handle ribbon at least out partially from the envelope and/or the interior cavity of the respective sieve. Other factors, such as strength of the handle ribbon, its attachment to the remainder of the sieve, and similar items can be considered for the design of the frangible elements.

FIGS. 17A and 17C illustrate another construction for the frangible elements. There, other frangible elements include heat welded portions 84A', 84B' that secure the top and bottom panels of the envelope 80E2 together. These heat welded portions between the panels can be formed by partially melting the material from which the panels are constructed so that they bond to one another in a fused or melted region. The welds can be configured to fail upon the application of a predetermined tension or force to the respective handle ribbon. In which case, upon failure or breakage, the frangible elements enable at least a portion of the handle ribbon to exit from the envelope and the respective interior cavity. The holding strength of the heat welds can vary depending on their size, the heat applied, the material used to construct the sieve and other factors. In other embodiments, the heat welds 80A' and 80B' can be substituted with drops of glue, cement, adhesives or fasteners located between the respective panels of the respective envelopes. Particular adhesives can be formulated to fail and/or allow the respective panels of the envelope to break away upon application of a preselected force to the handle ribbon.

As shown in FIGS. 17 and 17A, the first and second handle ribbons 81 and 82 can be generally elongate strips of material. As shown, they can be constructed from flat sheets of material such as a polymer plastic or other polymer. As used herein, handle ribbons can also be in the form of, and can refer to strings, chords, ropes, wire, or other elongate elements constructed from a variety of materials. The handle ribbon as illustrated is in a flat form and of a miniscule thickness. This, of course, can be changed depending on the particular application and amount of animal waste expected to be removed using the sieve and/or liner of a similar construction.

Each of the first and second handle ribbons 81 and 82 can be configured and disposed within the envelopes 80E1 and 80E2 so that at least half the length of the handle ribbon is disposed between the top 80T and bottom 80B panels of the respective envelopes. In some cases, at least two thirds or three quarters of the entire length of the handle ribbons can be disposed within the respective envelopes and concealed substantially there within. The portion of the handle ribbon 81 adjacent the access recess 81R and 82R can be exposed and unconcealed by the envelope. This can enable the user to grasp the handle ribbon in that location and pull it to at least partially destroy the envelope and remove the handle ribbon therefrom.

The handle ribbon shown in FIG. 22A can include a first end 81A and a second end 81B. Generally, these first and second ends of the first handle ribbon 81 can be disposed on opposite sides of the sieve 80, close to the respective corners 80C of the sieve. The end 81A and 81B, ends can be permanently secured to the sieve envelope, and in particular the top panel 80T and/or bottom panel 80B. As shown, in FIG. 22A, the end 81A can be heat welded with heat welds 80H to the top panel 80T and the bottom panel 80B. This again can provide a secure and relatively permanent attachment of the handle to the sieve, even when the remainder of the ribbon is pulled out from the envelope 80E1 as shown in FIG. 22. Optionally, the ends can be attached to the interior of the envelope generally within the first 80CE and second 80CE' opposite ends of the first interior cavity.

Further optionally, opposite the ends 81A and 81B cannot be removed from the envelope and/or respective panels of the sieve without destroying one or both. The strength with which the handle ribbon is attached to the sieve at its first and second ends can depend on the intended use of the sieve. For example, where the sieve will be used to lift a significant amount of litter in a large basin, the points of attachment of the handle ribbon ends to the envelope and/or sieve can be significant. Where the sieve will be used with a relatively smaller basin and a small amount of litter, less securement of the ends of the handle ribbon to the envelope can be utilized. Although the handle ribbon ends are shown as being connected with heat welds 80H, the ribbon 81 can also be attached at its ends to the envelope and/or sieve using cement, adhesives, or even fasteners such as rivets, tacks, staples, studs or other types of fasteners.

Operation of the sieve 80 will now be explained with reference to FIGS. 18-23. As shown in FIG. 18, the sieve 80 can be initially engaged by a user U. This can be performed when the litter (not shown) is ready for sifting to remove animal waste through the sieve. The user U engages the ribbons 81 and 82 exposed through the respective access recesses 81R and 82R. At this point, the ribbon is substantially disposed within the respective envelope 80E1. The frangible elements 83A, 83B and 83C are generally all intact and unbroken. Optionally, the frangible elements 83A, 83B and 83C can be positioned in series. The first elements can break first, the second elements can break second and the third frangible elements can break after that. Additional frangible elements can break subsequent to the same. The above configuration of the handle ribbon being in the envelope generally prevents that ribbon from tangling with the ribbons of other sieves and/or liners placed adjacent it. For example, when multiple sieves are stacked upon one another or a liner, their corresponding ribbons do not become tangled to inhibit separation, movement or other manipulation of the sieves and/or liner.

Figure 19:
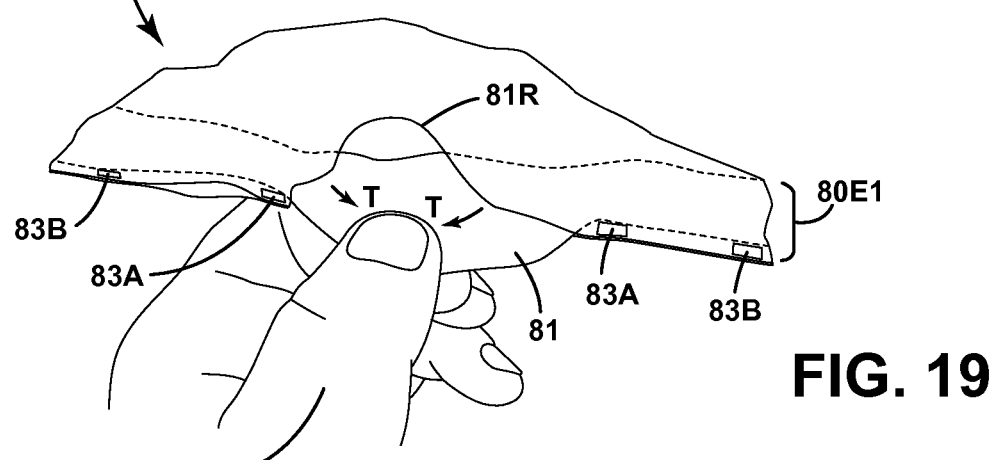
FIG. 19 is a close up view of the handle ribbon as first frangible elements of the sieve are being stressed under a force of pull by the user.

Continuing at FIG. 19, the user U exerts a force T which generally can be in the form of a tension placed on the first ribbon 81. As the tension increases, it opposes the weight of litter and animal waste disposed within the sieve. The tension also begins to increase the forces exerted upon the first frangible elements 83A because the ribbon engages those elements.

Figure 20:
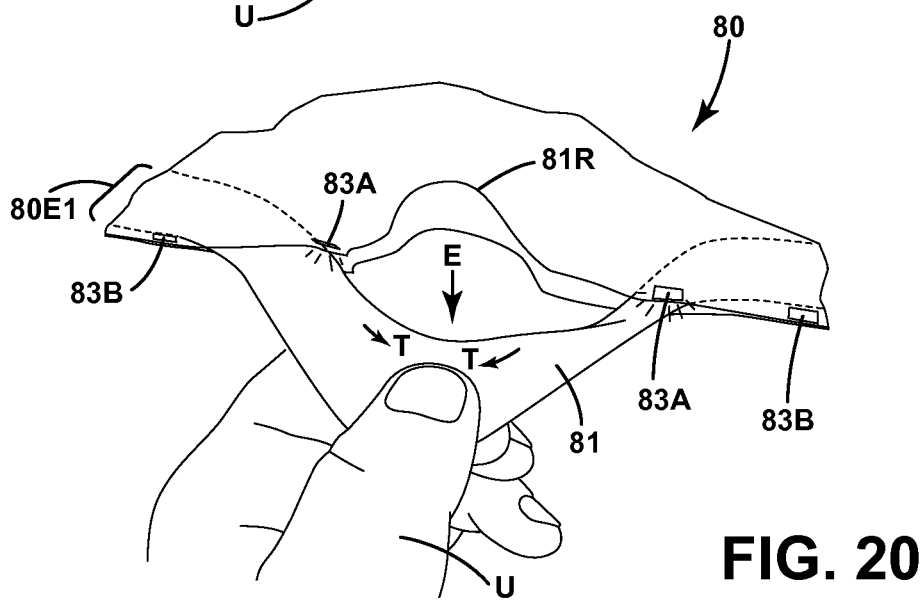
FIG. 20 is a close up view of the handle ribbon as first frangible elements of the sieve are stressed to failure and breaking to release a part of the handle ribbon from the envelope under the force of pull by the user, with second frangible elements of the sieve subsequently being stressed under a force of pull by the user.

The user U continues to exert tension T on the ribbon 81 at a predetermined force of optionally at least 0.5 lbs., 1 lb., 2 lbs., 3 lbs., 4 lbs., 5 lbs., 10 lbs., 15 lbs., 20 lbs. or more depending on the application. Eventually, the first frangible elements 83A break or fail. Upon the breakage or failure, these elements can pop or snap—or can emit no audible sound. When the frangible elements break, they enable an additional portion of the ribbon 81 to exit the portion of the envelope 80E1 adjacent the frangible elements 83A. Thus, more of the ribbon becomes exposed and exits the envelope in the direction E as illustrated in FIG. 20.

As shown in FIG. 21, the handle ribbon 81 is withdrawn even farther from the envelope 80E1. In this part of the extraction of the ribbon 81 from the envelope 80E1, the second frangible elements 83B snap or break to enable even more of the ribbon 81 to exit the envelope in direction E.

As shown in FIG. 22, the ribbon 81 is substantially removed from the envelope 80E1. The frangible elements associated with the envelope 80E1 are all broken or have failed to extract a substantial portion, for example, at least one half and up to three quarters or more of the length of the ribbon 81 from the envelope 80E1. The ends 81A and 81B of the envelope 80E1 however remain securely attached to the remainder of the sieve so that the handle ribbons 81 can act as handles to pull up and lift the sieve when it is filled with litter and/or animal waste.

Figure 23:
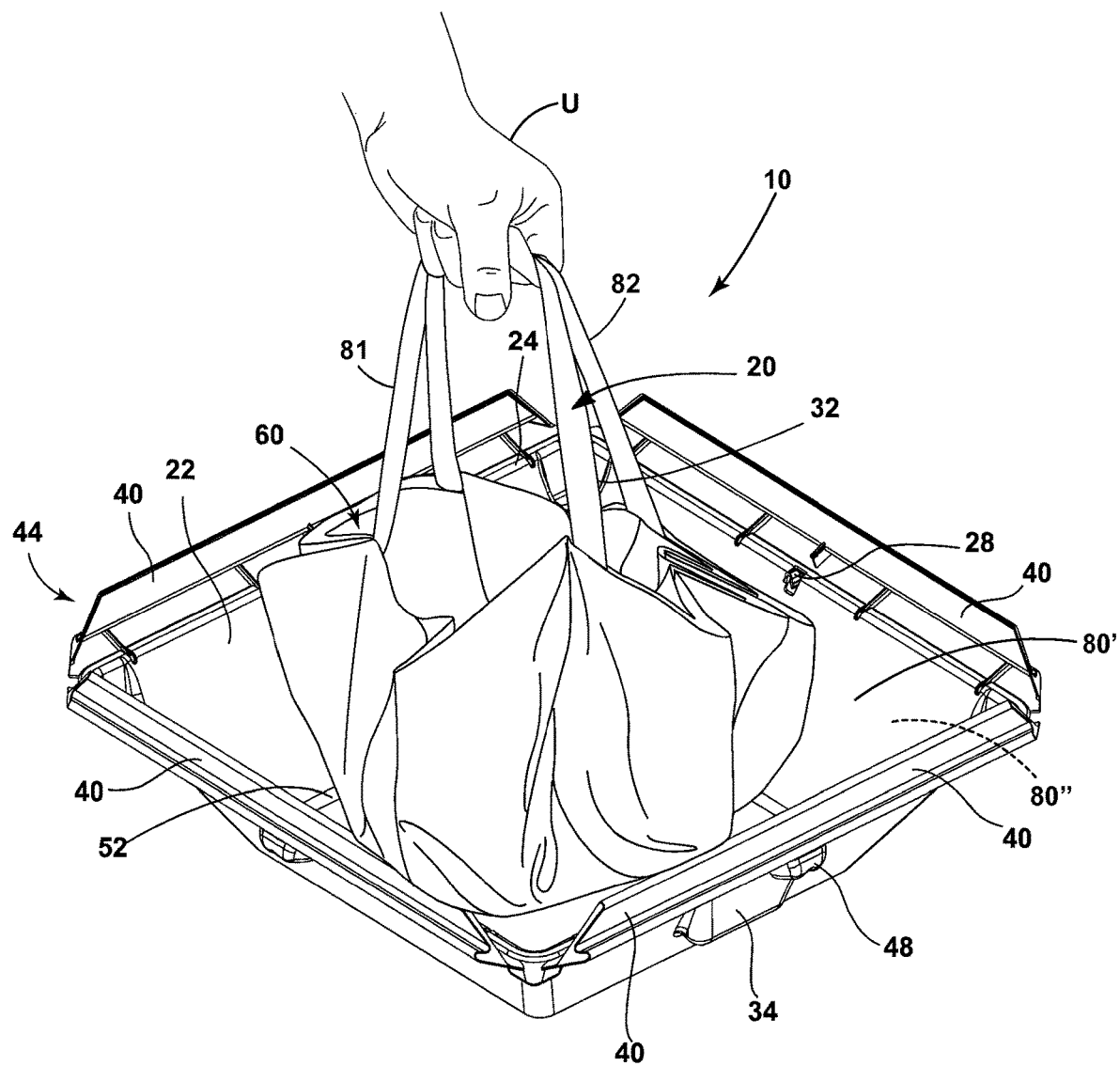
FIG. 23 is a perspective view of the sieve after all the frangible elements of the sieve are broken and the handle ribbons on opposing sides of the sieve are being used to pull up the sieve from the basin, thereby sifting the litter from the sieve and retaining associated animal waste.

In FIG. 23, the lifting action and operation of the sieve 80 is illustrated. There, the sieve 80 is filled with litter and animal waste that drains through the holes defined by the bottom of the sieve. The handle ribbons 81 and 82 have been substantially extracted from and removed from the respective envelopes at the opposing ends of the sieve. The handle ribbons 81 and 82 can be joined near one another and optionally tied by the user U. After the litter material is sifted through the openings the sieve can be removed with the animal waste within it.

The unused litter material, drains and rests upon the next adjacent sieve 80'. This next adjacent sieve 80' can include the same features, components and can function the same way as the previous sieve 80. Only after sufficient animal waste and litter has been deposited, is the sieve 80' engaged at the ribbon handles to remove the same. This operation of pulling and filtering animal waste from unused litter can be repeated multiple times depending on the number of additional sieves 80', 80", etc., associated with the animal waste disposal system.

Optionally, the sieves of the embodiments described herein can be provided in packets along with one or more liners. The multiple sieves can be stacked one upon the other with their handle ribbons aligned. Generally, the sieves and liner are flexible enough to be folded over upon one another to reduce the overall footprint of the packet. With the handle ribbons of the current embodiment being temporarily disposed and/or secured within the envelopes, the stacking and handling can be facilitated because these handle ribbons do not tangle or cause issues.

Another alternative embodiment of the removal element, that is a litter sieve and/or liner, is illustrated in FIGS. 24-28 and generally designated 180. Generally, this alternative removal element is similar in structure, function and operation to the litter sieve and liners as discussed in the embodiments above with a few exceptions. For example turning to FIGS. 24-26, the removal element, which here is described in connection with a litter sieve 180, can include a base 180B which generally forms the bottom thereof.

Figure 28:
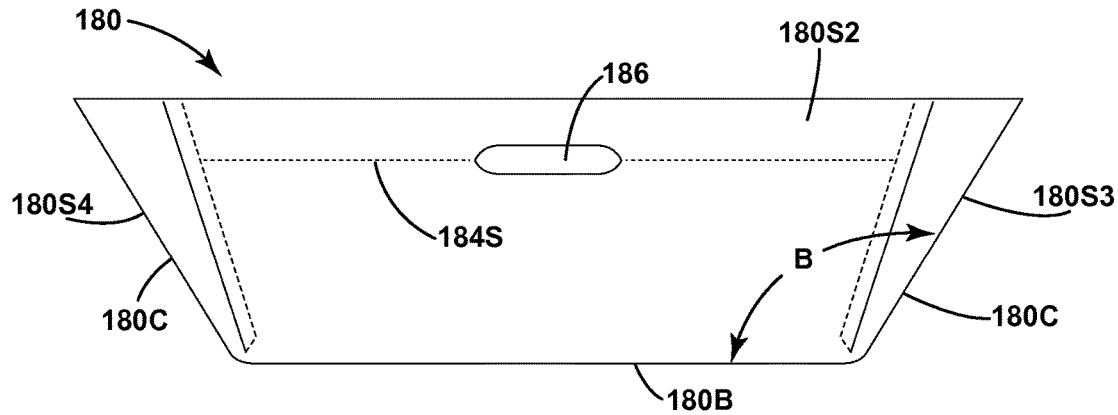
FIG. 28 is a side view thereof with the sieve being in a three-dimensional configuration, ready to be installed in the basin.

To the base 180B, multiple sidewalls 180S1, 180S2, 180S3 and 180S4 can be joined. Generally, the sidewalls can extend upwardly and away from the base, particularly when the sieve 180 is disposed in a basin like that described above, and the sidewalls of the basin optionally support the respective sidewalls of the sieve. As illustrated in FIG. 28, the sidewalls, after the removal element 180 is constructed, can be disposed at an obtuse angle B relative to the base 180B. This angle B can range from optionally 91° to 150°, further optionally 91° to 135°, and even further optionally 91° to 110°, or other angles depending on the particular application.

Although shown as including only four sidewalls, additional sidewalls can be added, or some sidewalls can be deleted. Further, the sieve can include a continuous sidewall depending on the application. As shown, the sidewalls can be joined at corners 180C. Optionally, the sidewalls can be longer or of a larger dimension at their tops. For example, top 180S4T can be longer than the bottoms 180S4B. In this manner, the sidewalls can generally form trapezoidal or non-rectangular shapes. At their ends, each sidewall can be joined with adjacent sidewalls via the corners 180C. Collectively, the sidewalls and base can cooperatively form and interior space S within which litter material and animal waste can be deposited. With the structure of the removal element, the litter material can be filtered out from the removal element, so that only the animal waste remains in the removal element and can be disposed of appropriately.

The sieve 180 can be constructed from the same materials as the sieve and/or liner mentioned above. The configuration of the litter material openings, also referred to as holes 180H defined in the base 180B can be in a full rectangular shape, occupying a majority of the base so that the majority of the base can function as a sieve to allow litter material to filter through it, yet retain animal waste in the sieve for disposal. Optionally, the holes 180H are defined substantially only in the bottom or base 180B, without extending up into or being defined by the respective sidewalls of the sieve 180. For example, the holes also can be defined so that they do not extend up into or overlap with the sidewalls 180S2, 180S4 as shown in FIG. 25.

Figure 25:
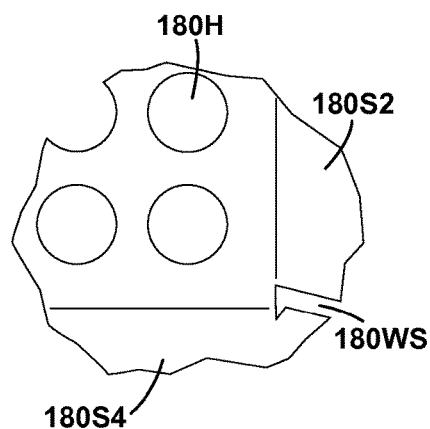
FIG. 25 is a close up, top plan view thereof taken from view XXIV in FIG. 24.

Referring further to FIG. 25, which illustrates a close-up of the holes 180H, the holes can be of a circular configuration. The holes can have diameters of optionally 0.1 inches to 0.75 inches, further optionally 0.25 inches to 0.5 inches, or other diameters depending on the size of the animal waste to be filtered and/or the litter material that drains through the holes. The centers of adjacent holes can be spaced away from one another optionally 0.25 inches to 3 inches, further optionally 0.5 inches to 1 inch, again depending on the application.

Figure 24:
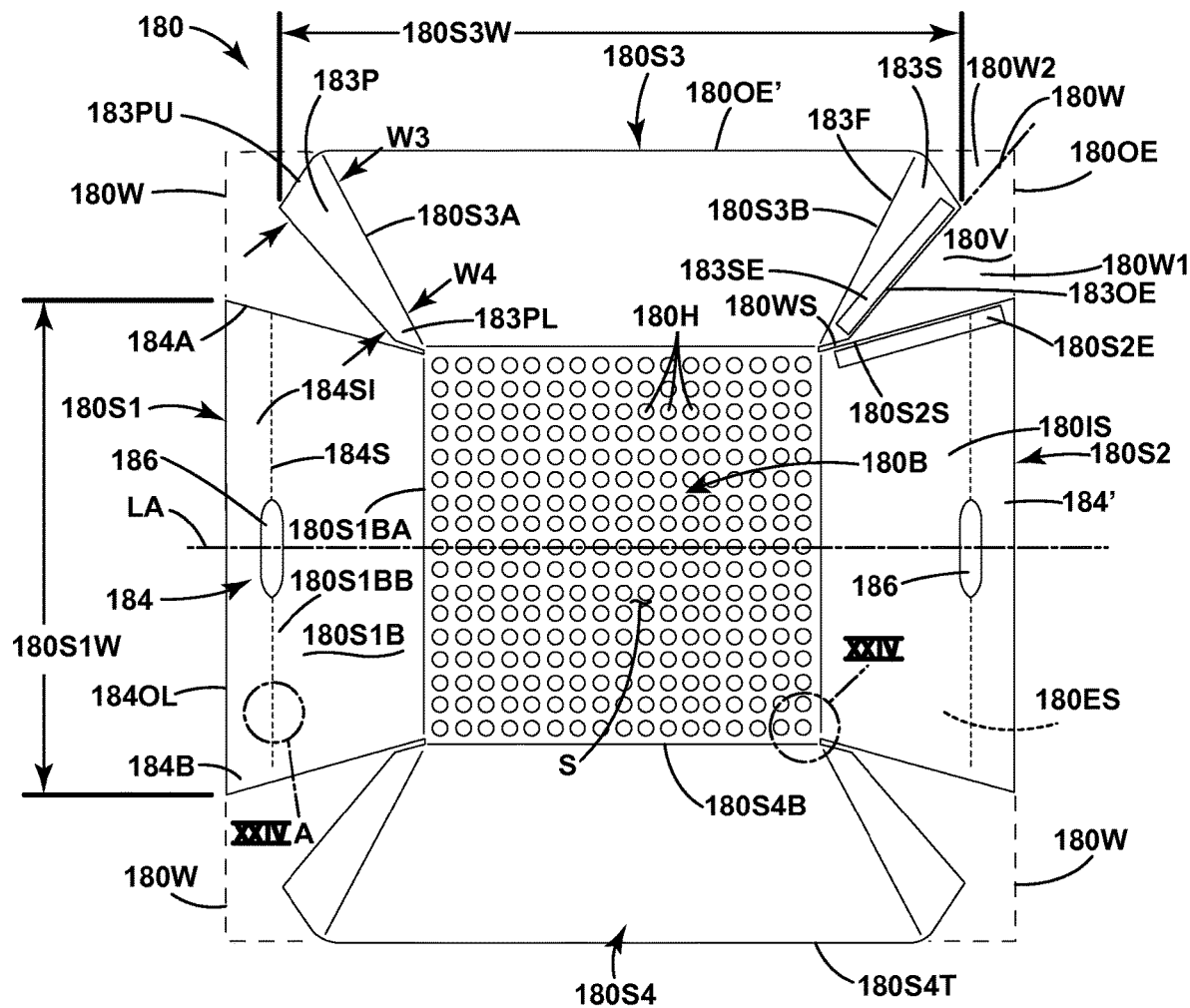
FIG. 24 is a top plan view of view of yet another alternative sieve for use with the litter disposal system, with the sieve being in a flat, two-dimensional configuration.
Figure 26:
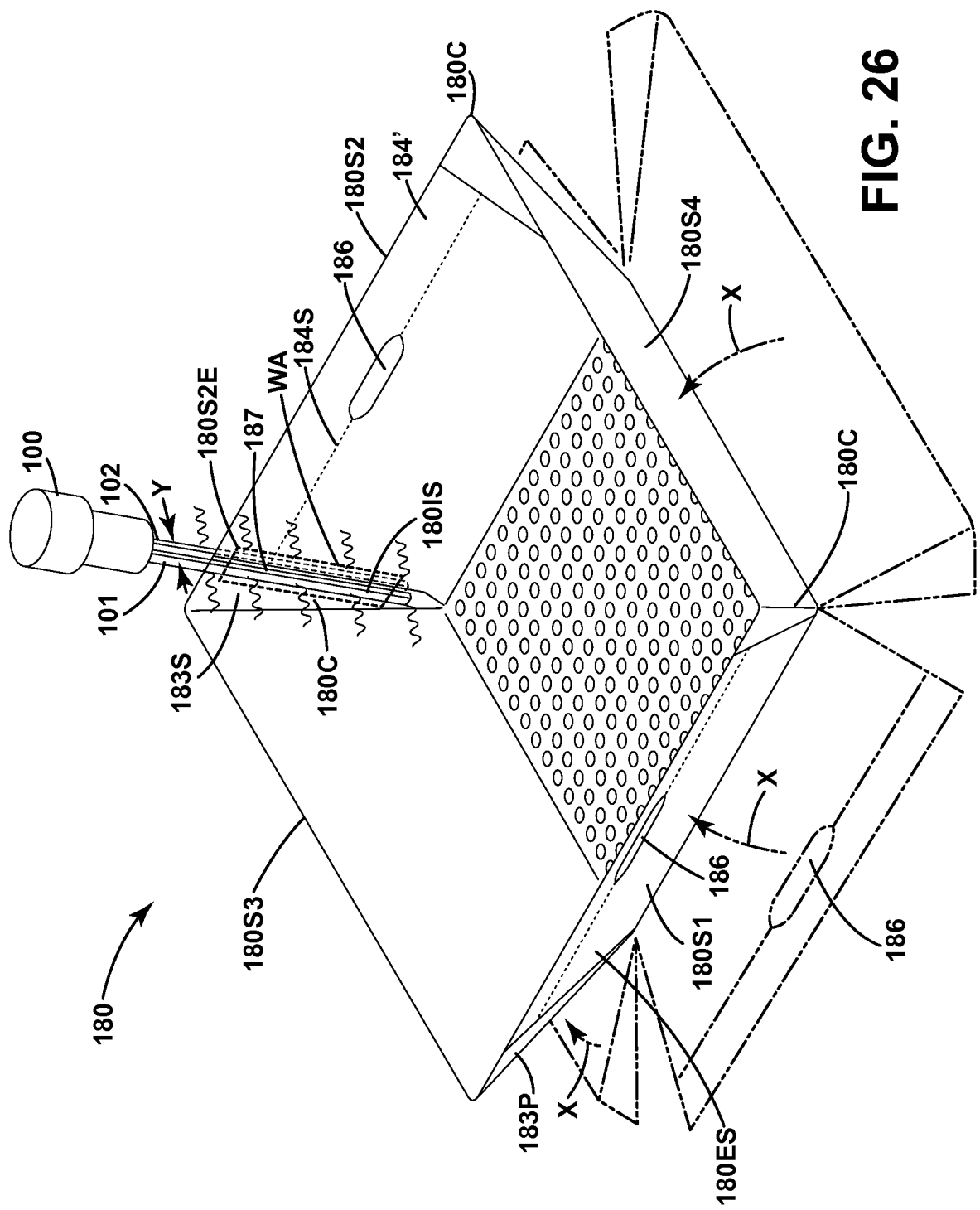
FIG. 26 is a perspective view thereof, with the sieve being in a three-dimensional configuration, ready to be installed in the basin.

Referring to FIGS. 24 and 26, the sieve 180 can take on multiple forms as it is manufactured or otherwise assembled. For example, the sieve 180 can be initially constructed as a flat two-dimensional, rectangular, square, polygonal or other shaped planar sheet with completely open litter material openings 180H defined therein as shown in FIG. 24. There, the sieve 180 can include the respective sidewalls 180S1, 180S2, 180S3 and 180S4. These elements are all attached at their bottoms to the base 180 B. Between adjacent sidewalls, for example sidewall 180S3 and 180S2 waste material 180W is removed from the sheet to form corner voids 180V, optionally disposed at locations that will eventually form the corners of the finished removal element. The precise shapes of the waste material 180W removed can be determined by the nature of the joining of adjacent sidewalls with one another at a corner 180C for example the waste material 180W can be removed so as to form a primary triangular opening 180W1 that extends to and outer edge 1800E of the initial planar sheet. The primary triangular opening 180W1 can transition at an innermost tip to an elongated slit or opening 180WS. This elongated slit 180WS can extend toward and terminate at the base 180B as shown in FIG. 25. The waste material can also be removed so as to form a secondary triangular opening 180W2 that is contiguous with the primary to regular opening 180W1. This secondary triangular opening 180W2, however can extend to and outer edge 1800E', which itself intersects the other outer edge 1800E, optionally at a quarter of the flat rectangular sheet. Collectively, the primary triangular opening and the secondary triangular opening form the respective corner voids 180V. Of course, the precise shapes of the removed waste material can differ from a triangular shape. For example they can be of other polygonal shapes, or in some cases parabolic or other rounded shapes, depending on the application.

With the waste material 180W removed from the initial flat planar sheet, the respective sidewalls can be formed identically, as rectangles or squares, or as illustrated in FIG. 24 different respective sidewalls can include different dimensions and shapes. For example, the first sidewall 180S1 can be constructed to include a first overall length 180S1W. This length can be measured at the greatest with of the sidewall between its bottom and uppermost portions. The third sidewall 180S3 can be constructed to include a third overall length 180S3W. This third overall length can be greater than the first overall length. Of course in certain applications the first and third overall lengths can be identical or reversed, with the first overall length being greater than a third overall length. In addition, it will be noted that the other sidewalls, for example 180S2 and 180S4 can have similar length relationships.

As also shown in FIG. 24, one or more of the sidewalls can be constructed to include overlap flaps. For example, third sidewall 180S3 can be constructed to include a first end 180S3A and a second opposing end 180S3B. From the first end 180S3A can extend a primary overlap flap 183P. A secondary overlap flap 183S can extend from the second end 180S3B. These overlap flaps can be mirror images of one another, or in some cases, where different structural integrity is designated for different corners, the overlap flaps can be reconfigured in different shapes.

For simplicity, only the secondary overlap flap will be described here. It will be appreciated that the primary overlap flap is similar in construction and operation. The secondary overlap flap 183S generally projects into the void 180V when the sheet is in the flat planar configuration. The flap 183S can include and outer edge 183OE that is distal from a fold or bend line 183F, which itself is immediately adjacent the second end 180S3B of the sidewall 180S3. Optionally, in this configuration, the secondary overlap flap can be an extension of the sidewall.

The secondary overlap flap can also include an overlap engagement area 183SE adjacent the outer edge 183OE. The overlap engagement area can be configured to overlap and engage either an interior surface 180IS or an exterior surface 180ES of the sidewalls, sheet or removal element depending on the configuration of the same. As illustrated in FIG. 24, the overlap engagement area and secondary overlap flap can be configured to overlap a sidewall engagement area 180S2E of sidewall 180S2. This sidewall engagement area 180S2 can be disposed on the exterior 180ES of the sidewall 180S2. In other constructions, the secondary overlap flap optionally can be configured to fold inward, toward the base, so that when the sheet is converted from a two dimensional to a three dimensional form, the secondary over flap overlays and engages engagement surface disposed on the interior surface 180IS of the sidewall, sheet and/or removal element.

The secondary overlap flap can include an overlap engagement area 180SE that is of a sufficient area to overlap at least a portion of an adjacent sidewall, for example the second sidewall 180S2. The precise distance of the overlap can depend on the material from which the sheet is made, the type of animal waste to be disposed of, and the weight of the litter material disposed in the removal element. Generally, the outer edge 183OE of the overlap flap 1803S can be configured to overlap the adjacent edge 180S2S of the second sidewall optionally 0.25 inches to 2.5 inches, further optionally 0.5 inches to 1.5 inches or other amounts depending on the particular application. Thus, when the overlap flap of one sidewall is overlapped over an adjacent sidewall, there is a sufficient amount of material that can be welded, glued, adhered, fastened or otherwise attached to secure the overlap flap to the adjacent sidewall, along its interior surface and/or exterior surface depending on the application. As described below, this fastening of the overlap flap to an adjacent sidewall is what forms a respective corner 180C of the removal element. Further, when this fastening occurs, the respective overlap flap is fixedly and immovably secured to the sidewall, edits exterior and/or interior surface to form the respective adjacent corner. It is also contemplated that the fixed and immovable fastening makes it difficult if not impossible to detach the overlap flap from the adjacent sidewall without substantially destroying, tearing or otherwise damaging one or both of these structures. In other words, the overlap flap cannot be nondestructively separated from an adjacent sidewall after attached thereto.

As shown in FIG. 24, it is also contemplated that the overlap flap of a particular sidewall can be of varying widths. For example with reference to the primary overlap flap 183P, the overlap flap can include an upper portion 183PU and a lower portion 183PL. The lower portion can be closer to the base 180B than the upper portion 183PU. Generally, the overlap flap can taper in width between the lower portion and the upper portion, becoming wider toward the upper portion. Put another way, the overlap flap can taper from narrow width W4 to a wider width W3 in transitioning from the lower portion to the upper portion of the overlap flap. In other constructions, the widths W3 and W4 can be identical so that the overlap flap can be generally of a rectangular shape, rather than a tapering polygonal shape as illustrated in FIG. 24.

As shown in the figures, the overlap flaps can be joined at opposing ends of the first sidewall 180S3 and the second sidewall 180S4. In an alternative construction, each of the sidewalls 180S1, 180S2, 180S3 and 180S4 can include single overlap flaps. In yet other constructions, the sidewalls 180S1 and 180S2 can include primary and secondary overlap flaps at opposing ends, so that the other sidewalls did not include such flaps. Optionally, the overlap flaps can be mixed and matched with different sidewalls depending on the particular application.

Figure 27:
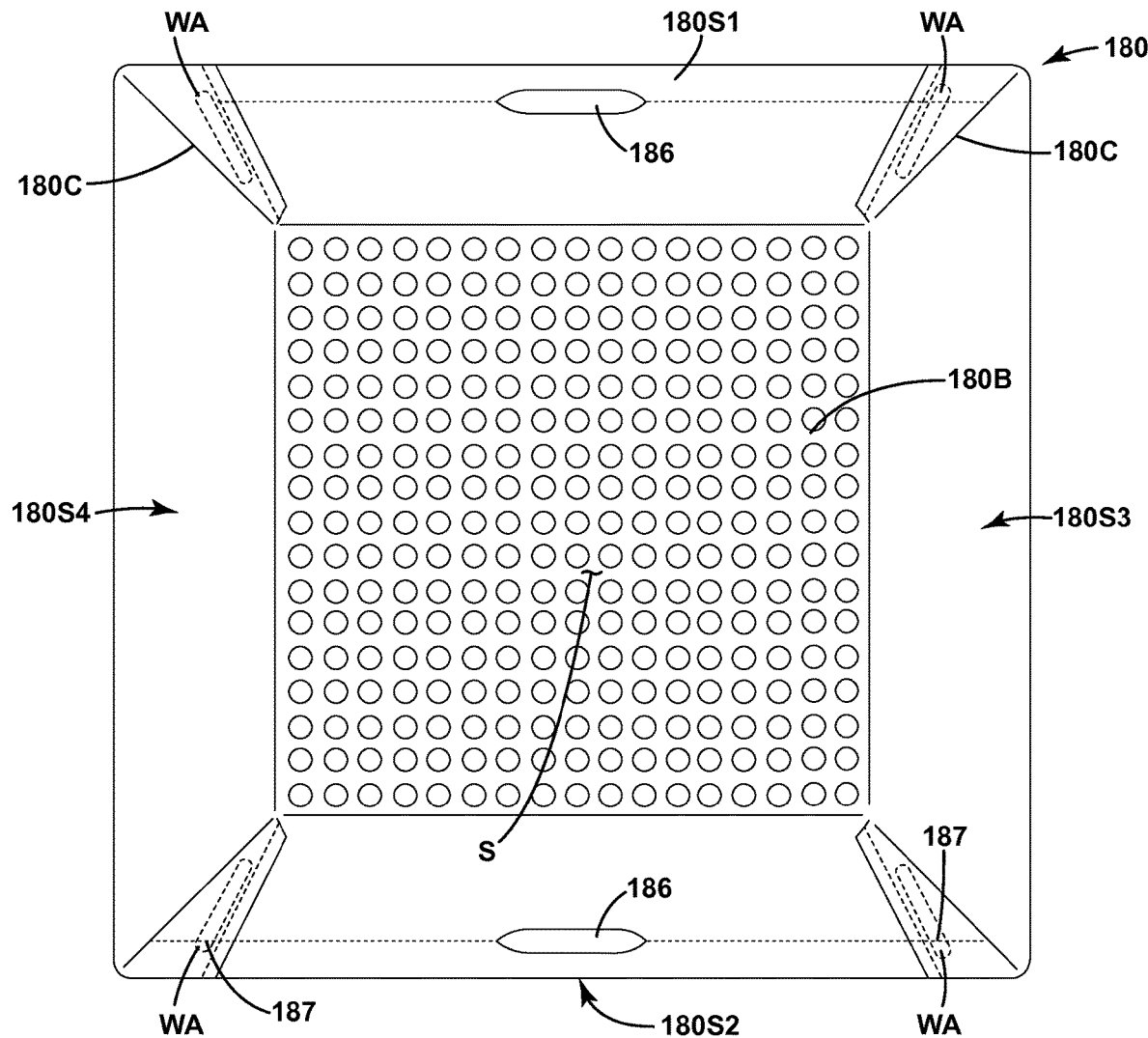
FIG. 27 is a top plan view thereof with the sieve being in a three-dimensional configuration, ready to be installed in the basin.

As mentioned above, the removal element can also be constructed to include elongated strips that can form handles that enable a user to lift a base portion of the removal element so as to separate animal waste from litter material as the litter material drains through the holes 180H in the base 180B. Turning to FIGS. 24 and 27, these elongated strips will be explained in connection with the first sidewall 180S1. It will be understood that the elongated strips and respective handles and other components can be duplicated on other sidewalls, such as the second sidewall 180S2, or yet additional sidewalls where the same are included in the removal element. Further, will be appreciated that in some cases the elongated strips can be disposed across from one another on opposing sides of the removal element, across a longitudinal axis LA. Certain components of the sidewalls also can be aligned along this longitudinal axis LA.

Sidewall 180S1 can include a main body 180S1B. The main body can generally extend from a first lower portion 180S1BA to a first upper portion 180S1BB. The width of the main body in this region can optionally be uniform. A first elongated strip 184 can be joined with the first sidewall 180S1. Generally, by being joined with the sidewall, the strip can be integrally formed with the sidewall from the polymeric sheet. Alternatively, the elongated strip can be later secured to the main body of the sidewall. The first elongated strip 184 can include a first outer lateral edge 184OL that forms an outermost boundary of the strip. The first elongated strip 184 also can include a first strip interior portion 184SI disposed opposite the first outer lateral edge, generally across a width of the elongated strip. This first strip interior portion when 184S1 can be disposed immediately adjacent the upper portion 180S1BB of the sidewall.

Figure 25A:
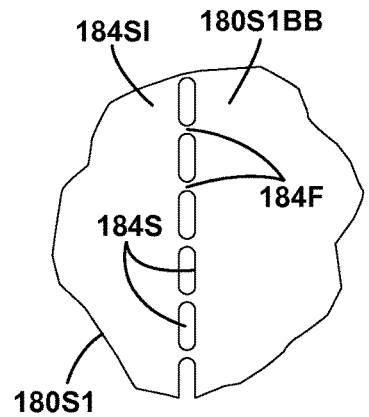
FIG. 25A is a close up, top plan view of perforations taken from view XXIVA in FIG. 24.

As shown in FIG. 25A, the sidewall 180S1 can define one or more slits that collectively can form a line of perforations. Generally, the plurality of perforations 184S can be defined between the first strip interior portion 184SI and the first upper portion 180S1BB of the first sidewall 180S1. The slits or perforations themselves can create a line of weakness that enables a user to separate a portion of the elongated strip 184 from the main body of the sidewall. The slits can be separated from one another by frangible elements 184F that extend from and generally connect the first strip interior portion and the first upper portion of the first sidewall. These frangible elements 184F can be sized so that the elongated strip 184 can be at least partially separated from the sidewall using about 2 pounds to about 5 pounds of force, applied manually by user, without the use of separate tools.

Optionally, one or more sidewalls can define handle openings 186. These handle openings, for example can be disposed between opposing ends 184A and 184B of the elongated strip 184. More particularly, the handle openings can be disposed centrally between these ends, or about midway between the ends. These handle openings also can be defined on opposing sidewalls, for example, sidewalls 180S1 and 180S2 along a common longitudinal axis LA. This can distribute weight symmetrically when the removal element is removed from the basin to dispose of animal waste.

Further optionally, one or more handle openings 186 can be defined in one or more sidewalls to facilitate separation of the elongated strips from the respective main bodies of the sidewalls. For example, as shown in FIG. 24, the handle opening 186 forms a discontinuity in the plurality of perforations 184S. This discontinuity can be in the form of an opening sized so that a user can extend digits through the opening, pull on the elongated strip, and separate the elongated strip from the main body, at least partially along the length of the perforations so as to at least partially separate the elongated strip from the main body. When the handle opening is disposed along the plurality of perforations, those perforations can generally form a first set of perforations on one side of the handle opening a second set of perforations on opposing side of the handle opening. One or more additional handle openings can be disposed along the perforations depending on the application. Further, although not shown, the handle opening 186 can be wholly contained within the elongated strip, in which case it will not interrupt or form a discontinuity in the plurality of perforations.

As shown in FIG. 27, and as described above, the respective sidewalls 180S1, 180S2, 180S3, 180S4 and the base 180B cooperatively form an interior space within which animal waste and litter material can be disposed. The respective sidewalls, at their respective ends and in connection with the overlap flaps described above can be tacked, sealed, hot welded, sonic welded, glued, adhered, fastened or otherwise joined with one another to form a plurality of corners 180C. At these corners, the overlap flaps are joined with the interior and/or exterior surfaces of the respective adjacent sidewalls. Generally, the sidewalls, base and corners form the removal element in a three dimensional shape, optionally in the form of a truncated upside down pyramid.

As discussed above, the corners can be welded with heat, with the overlap flaps being melted, fused, adhered or otherwise integrally formed with the respective adjacent side wall. This is illustrated in FIG. 26, where a welding unit 100 includes opposing elongated rods or plates 101 and 102. In operation, the plates are closed toward one another in the direction Y, with the overlap flap 183S and sidewall 180S2E disposed between the rods. The plates emit enough heat to plastically deform and/or weld the overlap flap to the sidewall and vice versa. This in turn creates a welded area WA, where optionally, the overlap flap is fused melted or otherwise nondestructively joined with the associated portion of the sidewall. This weld area can generally overlap with the overlap flap engagement area 183SE and/or the sidewall engagement area 180S2E. Again, in this area these portions of the flap and sidewall can be inextricably joined with one another.

The weld area WA also can overlap a portion of the perforations 184S. For example, the perforations 187 near a first end and a second end of the sidewall 180S2 can be overlapped with the welded area WA. In these regions, a preselected number of the perforations can be covered by the welded area so as to fuse the first primary overlap flap to the third sidewall, and so that the elongated strip and/or handle 184' cannot be nondestructively separated from the main body adjacent the welded area WA. In effect, where the overlap flap and sidewall are joined at the welded area, the slits within the perforations are at least partially closed off, with the opposing edges of the interior portion of the strip and the upper portion of the main body adhere, melt and/or fuse to one another. In addition or alternatively, the overlap flap, which might not include perforations, can bridge the respective slits, closing them off in the welded area. In this case, the perforations are effectively rendered inoperable so that the strip cannot be separated from the main body along a line of weakness of the perforations, at least in the welded area WA, which again can overlay at least a portion of the overlap flap.

As mentioned above, a method of constructing the removal element shown in FIGS. 24-28 is also provided. In the method, a flat two-dimensional sheet of polymeric material is provided. The sheet is cut, using die-cut, stamping, laser or other cutting or forming techniques, to form the respective components of the removal element. For example the she can be cut to define the litter sieve openings 180H, and the quarter voids 180V, as well as any desired handle openings 186. One or more slits, such as a plurality of perforations 184S, can also be cut or otherwise formed in the respective opposing sidewalls of the removal element.

With the sheet properly formed, it can be transformed from a flat two-dimensional configuration into the three dimensional configuration shown in FIG. 26. To do so, the sidewalls are moved upward in the direction of arrows X into the configuration shown in that figure. Generally, the main bodies of the sidewalls are disposed at the obtuse angle ß as described above, or some other angle, relative to the base of the sheet. Simultaneously, the corner voids 180V about the sheet can be closed, with the overlap flap beginning to and continuing to overlap an interior or exterior surface of and adjacent sidewall. The overlap flap also can be folded or otherwise moved into engagement with the respective interior or exterior surface of the sidewall. With the overlap flap and sidewalls in this configuration, the overlap flap is secured to the adjacent sidewall so as to form the respective corners 180C of the removal element 180. This can be performed by forming the welded area using adhesives, welding techniques such as hot welding or sonic welding, fasteners, or other techniques to join the overlap flap with the sidewall. In so doing, preselected ones of the perforations can be modified in an area, for example a welded area, adjacent the overlap so that the elongated handle is not nondestructively separable from the main body of the sidewall in the area.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A removal element for a waste disposal apparatus comprising:
    a base defining a plurality of litter material openings;
    a first sidewall, a second sidewall, a third sidewall and a fourth sidewall joined with and extending generally upward at an obtuse angle from the base, the first, second, third and fourth sidewalls and base all being formed from a unitary sheet of polymeric material, the first, second, third, fourth sidewalls and base at least partially forming an interior space within which animal waste can be deposited, each of the first, second, third and fourth sidewalls including a sidewall exterior surface that faces generally outward, away from the interior space, and a sidewall interior surface that faces generally inward, toward the interior space;
    a primary overlap flap extending from at least one of the second, third and fourth sidewalls, the primary overlap flap being fixedly and immovably secured to and overlapping at least one of the sidewall exterior surface and the sidewall interior surface of the first sidewall, adjacent the at least one of the second, third and fourth sidewall from which the primary overlap flap extends, thereby forming a corner between adjacent sidewalls,
    wherein at least a portion of the primary overlap flap extends into a corner void, the corner void formed by removal of waste material from the unitary sheet of polymeric material, before the primary overlap flap is fixedly and immovably secured to at least one of the sidewall exterior surface and the sidewall interior surface of the first sidewall, adjacent the at least one of the first, second, third and fourth sidewall from which the primary overlap flap extends; and
    a first elongated strip joined with the first sidewall, the first elongated strip including a first outer edge disposed opposite a first strip interior portion, the first strip interior portion disposed adjacent a first main body of the first sidewall with a plurality of first perforations defined between the first strip interior portion and the first main body of the first sidewall,
    wherein the plurality of first perforations are configured to allow the first elongated strip to be at least partially, manually separable from the first main body, so as to form an elongated handle when the elongated strip is at least partially separated from the first main body,
    whereby the elongated handle enables a user to lift at least a portion of the removal element so as to separate animal waste from litter material,
    wherein the first perforations extend at least to the corner,
    wherein the primary overlap flap overlaps a portion of the plurality of first perforations, thereby concealing that portion of the plurality of first perforations, with a remaining portion of the plurality of first perforations extending away from the primary overlap flap and being unconcealed by the overlap flap.

2. The removal element of claim 1 wherein the primary overlap flap is hot welded to the at least one of the exterior sidewall surface and the interior sidewall surface so as to fuse the primary overlap flap to the at least one of the exterior sidewall surface and the interior sidewall surface.

3. The removal element of claim 1,
    wherein the elongated strip includes a first end and a second end,
    wherein the perforations extend from adjacent the first end toward the second end,
    wherein the perforations are interrupted by a handle opening between the first end and the second end.

4. The removal element of claim 3 wherein the handle opening is centered on a longitudinal axis of the removal element.

5. The removal element of claim 1,
    wherein the primary overlap flap includes a flap upper portion and a flap lower portion,
    wherein the primary overlap flap is wider at the flap upper portion than at the flap lower portion.

6. The removal element of claim 1 wherein the primary overlap flap includes an outer edge, wherein the outer edge is disposed at a varying distance from the corner.

7. A removal element for a waste disposal apparatus comprising:
    a base;
    a first sidewall including a first main body having a first lower portion and a first upper portion, the first sidewall joined with the base at the first lower portion, the first sidewall including a first exterior surface and a first interior surface;
    a first elongated strip joined with the first sidewall, the first elongated strip including a first outer lateral edge disposed opposite a first strip interior portion, the first strip interior portion disposed adjacent the first upper portion of the first sidewall with a plurality of first perforations defined between the first strip interior portion and the first upper portion of the first sidewall;
    a second sidewall including a second main body having a second lower portion and a second upper portion, the second sidewall being disposed opposite the first sidewall across a longitudinal axis, the second sidewall joined with the base at the second lower portion, the second sidewall including a second exterior surface and a second interior surface;
    a second elongated strip joined with the second sidewall, the second elongated strip including a second outer lateral edge disposed opposite an second strip interior portion, the second strip interior portion disposed adjacent the second upper portion of the second sidewall with a plurality of second perforations defined between the second strip interior portion and the second upper portion of the second sidewall;

a third sidewall including a third main body having a third lower portion and a third upper portion, the third sidewall being disposed generally between the first sidewall and a second sidewall, the third sidewall joined with the base at the third lower portion, the third sidewall including a primary overlap flap at a first end of the third sidewall, the third sidewall including a secondary overlap flap at a second end of the third sidewall, the primary overlap flap overlapping the first sidewall exterior surface or the first sidewall interior surface, the secondary overlap flap overlapping the second sidewall exterior surface or the second sidewall interior surface; and a fourth sidewall being disposed generally between the first sidewall and the second sidewall;

wherein the primary overlap flap is fixedly and immovably secured with a first weld to at least one of the first sidewall interior surface and the first sidewall exterior surface to form a first corner, wherein the secondary overlap flap is fixedly and immovably secured to at least one of the second sidewall interior surface and the second sidewall exterior surface to form a second corner, whereby the base, first sidewall, second sidewall, third sidewall and fourth sidewall cooperatively form a space within which animal waste can be deposited, wherein the primary overlap flap extends into a first corner void disposed between the first sidewall and the third sidewall before the primary overlap flap is fixedly and immovably secured to the at least one of the first sidewall interior surface and the first sidewall exterior surface, wherein the secondary overlap flap extends into a second corner void disposed between the second sidewall and the third sidewall before the secondary overlap flap is fixedly and immovably secured to the at least one of the second sidewall interior surface and the second sidewall exterior surface, wherein the plurality of first perforations form a first line of weakness configured to allow a portion of the first elongated strip to be separated from the first main body of the first sidewall along the first line of weakness formed by the plurality of first perforations to thereby form a first handle, wherein the plurality of second perforations form a second line of weakness configured to allow a portion of the second elongated strip to be separated from the second main body of the second sidewall along the second line of weakness formed by the plurality of second perforations to thereby form a second handle, wherein the first weld is adjacent a portion of the first sidewall overlapped by the primary overlap flap, wherein the first weld intersects the plurality of first perforations at a first location, and wherein the first weld closes off at least one perforation of the plurality of first perforations thereby rendering inoperable the plurality of first perforations at the first location so that the first elongated strip cannot be nondestructively separated from the first main body along the first line of weakness formed by the plurality of first perforations at the first location.

8. The removal element of claim 7, wherein the base defines a plurality of litter sieve openings distributed across the entirety of the base, but the first, second and third sidewalls do not define any litter sieve openings through which litter material can travel.

9. The removal element of claim 7,
wherein the secondary overlap flap is fixedly and immovably secured with a second weld to at least one of the second sidewall interior surface and the second sidewall exterior surface to form a second corner,
wherein the second weld is adjacent a portion of the second sidewall overlapped by the secondary overlap flap,
wherein the second weld intersects the plurality of second perforations at a second location,
wherein the second weld closes off at least one perforation of the plurality of second perforations thereby rendering inoperable the plurality of second perforations at the second location so that the second elongated strip cannot be nondestructively separated from the second main body along the second line of weakness formed by the plurality of second perforations at the second location.

10. The removal element of claim 7 wherein the base, first sidewall, second sidewall and third sidewall, and the first and second elongated strips are constructed from a unitary sheet of polymeric material.

11. The removal element of claim 7 wherein the first sidewall defines a first handle opening disposed between a first end of the first elongated strip and a second end of the first elongated strip.

12. The removal element of claim 11 wherein the first handle opening forms a discontinuity in the plurality of perforations.

13. The removal element of claim 12 wherein the plurality of perforations is separated into a first set of perforations on one side of the first handle opening and a second set of perforations on an opposing side of the first handle opening.

14. The removal element of claim 7 wherein the first sidewall includes a first overall length, wherein the third sidewall includes a third overall length, wherein the third overall length is greater than the first overall length.

15. The removal element of claim 7 wherein the first, second, third and fourth sidewalls are all disposed at an obtuse angle relative to the base.

16. The removal element of claim 7 wherein the primary overlap flap and the secondary overlap flap each include a lower portion and an upper portion, wherein the overlap flap tapers in width between the lower portion and the upper portion, becoming wider toward the upper portion.

17. A method for making a removal element for an animal waste disposal apparatus, the method comprising:
providing a flat two dimensional sheet of polymeric material;
cutting the sheet to define a plurality of litter sieve openings in a base of the sheet;
cutting the sheet to define a plurality of corner voids disposed between adjacent sidewalls,
wherein the cutting of the sheet to define at least one of the corner voids produces an overlap flap;
defining a plurality of perforations between an elongated handle and a main body of at least one sidewall of the sheet;
moving the main body of the at least one sidewall so that the main body of the at least one sidewall is disposed at an obtuse angle relative to the base of the sheet, while simultaneously closing the at least one of the plurality of corner voids by extending the overlap flap over the at least one of the plurality of the corner voids toward the at least one sidewall to overlap a portion of the at least one sidewall; and fixedly and immovably securing the overlap flap to the at least one sidewall with a first weld to form at least one corner of a removal element;

wherein the plurality of perforations form a line of weakness configured to allow a portion of the elongated handle to be separated from the main body of the at least one sidewall of the sheet along a line of weakness formed by the plurality of perforations, wherein the first weld intersects the plurality of perforations at a first location, wherein the first weld closes off at least one of the plurality of perforations thereby rendering inoperable the plurality of perforations at the first location so that the elongated handle cannot be nondestructively separated from the at least one sidewall along the line of weakness formed by the perforations at the first location.

18. The method of claim 17, wherein the first weld is adjacent a portion of the at least one sidewall overlapped by the overlap flap.

19. The method of claim 17 wherein the sheet is transformed from a flat two-dimensional configuration to a three dimensional configuration during the moving step.

* * * * *